United States Patent
Wiley

(10) Patent No.: US 10,355,894 B2
(45) Date of Patent: Jul. 16, 2019

(54) SIMPLIFIED 3-PHASE MAPPING AND CODING

(71) Applicant: QUALCOMM Incorporated, San Diego, CA (US)

(72) Inventor: George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/128,348

(22) Filed: Sep. 11, 2018

(65) Prior Publication Data
US 2019/0097852 A1 Mar. 28, 2019

Related U.S. Application Data

(60) Provisional application No. 62/562,314, filed on Sep. 22, 2017.

(51) Int. Cl.
| | | |
|---|---|---|
| H04B 3/00 | (2006.01) | |
| H04L 27/20 | (2006.01) | |
| H04L 25/02 | (2006.01) | |
| H04L 25/49 | (2006.01) | |

(52) U.S. Cl.
CPC ...... *H04L 27/2057* (2013.01); *H04L 25/0272* (2013.01); *H04L 25/49* (2013.01)

(58) Field of Classification Search
CPC .. H04L 27/2057; H04L 25/49; H04L 25/0272
USPC ........................................................ 375/257
See application file for complete search history.

(56) References Cited

U.S. PATENT DOCUMENTS

| | | | | |
|---|---|---|---|---|
| 6,975,691 B1 * | 12/2005 | Shiraishi | ............. | H04L 27/2273 375/326 |
| 9,520,988 B1 | 12/2016 | Wiley et al. | | |
| 2003/0189986 A1 * | 10/2003 | Noda | ...................... | H04L 27/34 375/286 |
| 2016/0335204 A1 * | 11/2016 | Gans | ................... | G06F 13/1689 |
| 2017/0039163 A1 | 2/2017 | Sejpal et al. | | |

(Continued)

OTHER PUBLICATIONS

International Search Report and Written Opinion—PCT/US2018/050694—ISA/EPO—dated Dec. 6, 2018.

(Continued)

*Primary Examiner* — Don N Vo
(74) *Attorney, Agent, or Firm* — Loza & Loza LLP

(57) ABSTRACT

Systems, methods and apparatus are described that facilitate transmission of data between two devices within an electronic apparatus. An apparatus has a bus interface, a 3-phase encoder, and a processing circuit that can configure the 3-phase encoder for a first mode of operation in which data is encoded in a sequence of two-bit symbols, transmit a first three-phase signal representative of the sequence of two-bit symbols on each of the three wires. The processing circuit may be configured to configure the 3-phase encoder for a second mode of operation in which data is encoded in a sequence of three-bit symbols. Three-phase signal representative of the sequence of two-bit symbols or sequence of three-bit symbols on each of three wires, where a three-phase signal is in a different phase on each wire when transmitted, and a transition in signaling state occurs between transmission of each pair of symbols.

30 Claims, 22 Drawing Sheets

(56) References Cited

U.S. PATENT DOCUMENTS

2017/0264379 A1  9/2017  Wiley et al.

OTHER PUBLICATIONS

Poulton J W., et al., "Multiwire Differential Signaling", Aug. 6, 2003 No. 1.1 Aug. 6, 2003 {Aug. 6, 2003), pp. 1-20, XP002610849, Retrieved from the Internet: URL:http://www.cs.unc.eduf-jpfmwire.pdf [retrieved on Nov. 23, 2010] the whole document.

* cited by examiner

| Perm. | Wire Order | +x | -x | +y | -y | +z | -z | CW Order preserved? |
|---|---|---|---|---|---|---|---|---|
| 0 | ABC | +x | -x | +y | -y | +z | -z | Yes |
| 1 | ACB | -z | +z | -y | +y | -x | +x | No |
| 2 | BAC | -x | +x | -z | +z | -y | +y | No |
| 3 | BCA | +y | -y | +z | -z | +x | -x | Yes |
| 4 | CAB | +z | -z | +x | -x | +y | -y | Yes |
| 5 | CBA | -y | +y | -x | +x | -z | +z | No |

SIMPLIFIED 3-PHASE MAPPING AND CODING

PRIORITY CLAIM

This application claims priority to and the benefit of U.S. Provisional Patent Application Ser. No. 62/562,314 filed in the U.S. Patent Office on Sep. 22, 2017, the entire content of this application being incorporated herein by reference as if fully set forth below in its entirety and for all applicable purposes.

TECHNICAL FIELD

At least one aspect relates generally to high-speed data communications interfaces, and more particularly, providing a simplified encoding scheme for 3-phase interfaces.

BACKGROUND

Manufacturers of mobile devices, such as cellular phones, may obtain components of the mobile devices from various sources, including different manufacturers. For example, the application processor in a cellular phone may be obtained from a first manufacturer, while the display for the cellular phone may be obtained from a second manufacturer. Moreover, multiple standards are defined for interconnecting certain components of the mobile devices. For example, there are multiple types of interface defined for communications between an application processor and a display or camera within mobile device, including the Display System Interface (DSI) standard specified by the Mobile Industry Processor Interface (MIPI) Alliance.

The MIPI Alliance specifies the "C-PHY" standard, which provides high-speed data communication over a trio of wires. There is continuous demand for increased performance from mobile devices at decreased cost. The complexity of encoder/decoder circuits in a C-PHY interface can be a deterrent when the high-performance capabilities offered by the interface exceed the needs of the application. Additionally, complex device layouts may be required to facilitate flexible routing of the trio of wires.

SUMMARY

Certain embodiments disclosed herein provide systems, methods and apparatus that simplify encoding and decoding circuits in a C-PHY interface. Certain embodiments include circuits that enable devices to accommodate wiring misalignments without the use of complex multiplexing and/or switching circuits. According to certain aspects described herein, two Integrated Circuit (IC) devices may be collocated in an electronic apparatus and communicatively coupled through one or more data links. According to certain aspects described herein, two devices within a System-on-Chip (SoC) device may be communicatively coupled through one or more data links.

In an aspect of the disclosure, a method for data communications includes configuring a 3-phase encoder for a first mode of operation in which data is encoded in a sequence of two-bit symbols, transmitting a first three-phase signal that is representative of the sequence of two-bit symbols on each of three wires. The first three-phase signal is in a different phase on each wire when each symbol in the sequence of two-bit symbols is transmitted, and a transition in signaling state in one or more wires occurs between transmission of each pair of symbols in the sequence of two-bit symbols.

The method may include configuring the 3-phase encoder for a second mode of operation in which data is encoded in a sequence of three-bit symbols, and transmitting a second three-phase signal that is representative of the sequence of three-bit symbols on each of the three wires. The second three-phase signal is in a different phase on each wire when each symbol in the sequence of three-bit symbols is transmitted, and a transition in signaling state in at least one wire occurs between transmission of each pair of symbols in the sequence of three-bit symbols.

In certain aspects, signaling state of the three wires is defined by polarity and direction of rotation when the 3-phase encoder is configured for the first mode of operation. Each symbol in the sequence of two-bit symbols selects between four transitions that are available from each signaling state when the 3-phase encoder is configured for the first mode of operation. Each symbol in the sequence of two-bit symbols has a first bit that determines whether a next signaling state has a different polarity than a current signaling state, and a second bit defines phase rotation associated with the next signaling state. Each symbol in the sequence of three-bit symbols selects between five transitions that are available from each signaling state when the 3-phase encoder is configured for the second mode of operation. Each symbol in the sequence of three-bit symbols has a first bit that determines whether a next signaling state has a different polarity than a current signaling state, a second bit defines phase rotation associated with the next signaling state, and a third bit that determines whether the next signaling state involves only a polarity switch from the current signaling state.

In some aspects, the method includes determining presence of a misalignment of the three wires involving two or more wires, inverting a phase rotation bit of each symbol in the sequence of two-bit symbols when the misalignment of the three wires is determined to affect phase relationships between signals carried on the three wires when the 3-phase encoder is configured for the first mode of operation, and inverting a phase rotation bit of each symbol in the sequence of three-bit symbols when the misalignment of the three wires is determined to affect phase relationships between signals carried on the three wires when the 3-phase encoder is configured for the second mode of operation. The presence of the misalignment of the three wires is determined during a training transmission.

In an aspect of the disclosure, an apparatus has a bus interface configured to couple the apparatus to three wires of a communication link, a 3-phase encoder adapted to provide sequences of symbols used to configure three-phase signals transmitted over the three wires, and a processing circuit. The processing circuit may be configured to configure the 3-phase encoder for a first mode of operation in which data is encoded in a sequence of two-bit symbols, transmit a first three-phase signal that is representative of the sequence of two-bit symbols on each of the three wires, where the first three-phase signal is in a different phase on each wire when each symbol in the sequence of two-bit symbols is transmitted, and a transition in signaling state in one or more wires occurs between transmission of each pair of symbols in the sequence of two-bit symbols. The processing circuit may be configured to configure the 3-phase encoder for a second mode of operation in which data is encoded in a sequence of three-bit symbols, and transmit a second three-phase signal that is representative of the sequence of three-bit symbols on each of the three wires, where the second three-phase signal is in a different phase on each wire when each symbol in the sequence of three-bit symbols is transmitted, and a transition in signaling state in at least one wire occurs between transmission of each pair of symbols in the sequence of three-bit symbols.

In an aspect of the disclosure, a processor-readable storage medium has one or more instructions stored thereon. The instructions may be executed by at least one processor of a processing circuit. The instructions may cause the processing circuit to configure a 3-phase encoder for a first mode of operation in which data is encoded in a sequence of two-bit symbols, transmit a first three-phase signal that is representative of the sequence of two-bit symbols on each of three wires, where the first three-phase signal is in a different phase on each wire when each symbol in the sequence of two-bit symbols is transmitted, and a transition in signaling state in one or more wires occurs between transmission of each pair of symbols in the sequence of two-bit symbols. The instructions may cause the processing circuit to configure the 3-phase encoder for a second mode of operation in which data is encoded in a sequence of three-bit symbols, and transmit a second three-phase signal that is representative of the sequence of three-bit symbols on each of the three wires, where the second three-phase signal is in a different phase on each wire when each symbol in the sequence of three-bit symbols is transmitted, and a transition in signaling state in at least one wire occurs between transmission of each pair of symbols in the sequence of three-bit symbols.

In an aspect of the disclosure, an apparatus has means for configuring a 3-phase encoder, where in a first mode of operation, data is encoded in a sequence of two-bit symbols, and in a second mode of operation, data is encoded in a sequence of three-bit symbols. The apparatus has means for transmitting three-phase signals on each of three wires, where in the first mode of operation, a first three-phase signal that is representative of the sequence of two-bit symbols is transmitted on each of the three wires, and the first three-phase signal is in a different phase on each wire when each symbol in the sequence of two-bit symbols is transmitted, and a transition in signaling state in one or more wires occurs between transmission of each pair of symbols in the sequence of two-bit symbols. In the second mode of operation, a second three-phase signal that is representative of the sequence of three-bit symbols is transmitted on each of the three wires, where the second three-phase signal is in a different phase on each wire when each symbol in the sequence of three-bit symbols is transmitted, and a transition in signaling state in one or more wires occurs between transmission of each pair of symbols in the sequence of three-bit symbols.

BRIEF DESCRIPTION OF THE DRAWINGS

FIG. 14 illustrates a mapping of wire states of an un-permutated trio of wires to states occurring for different permutations of wire configuration.

DETAILED DESCRIPTION

Figure 1:
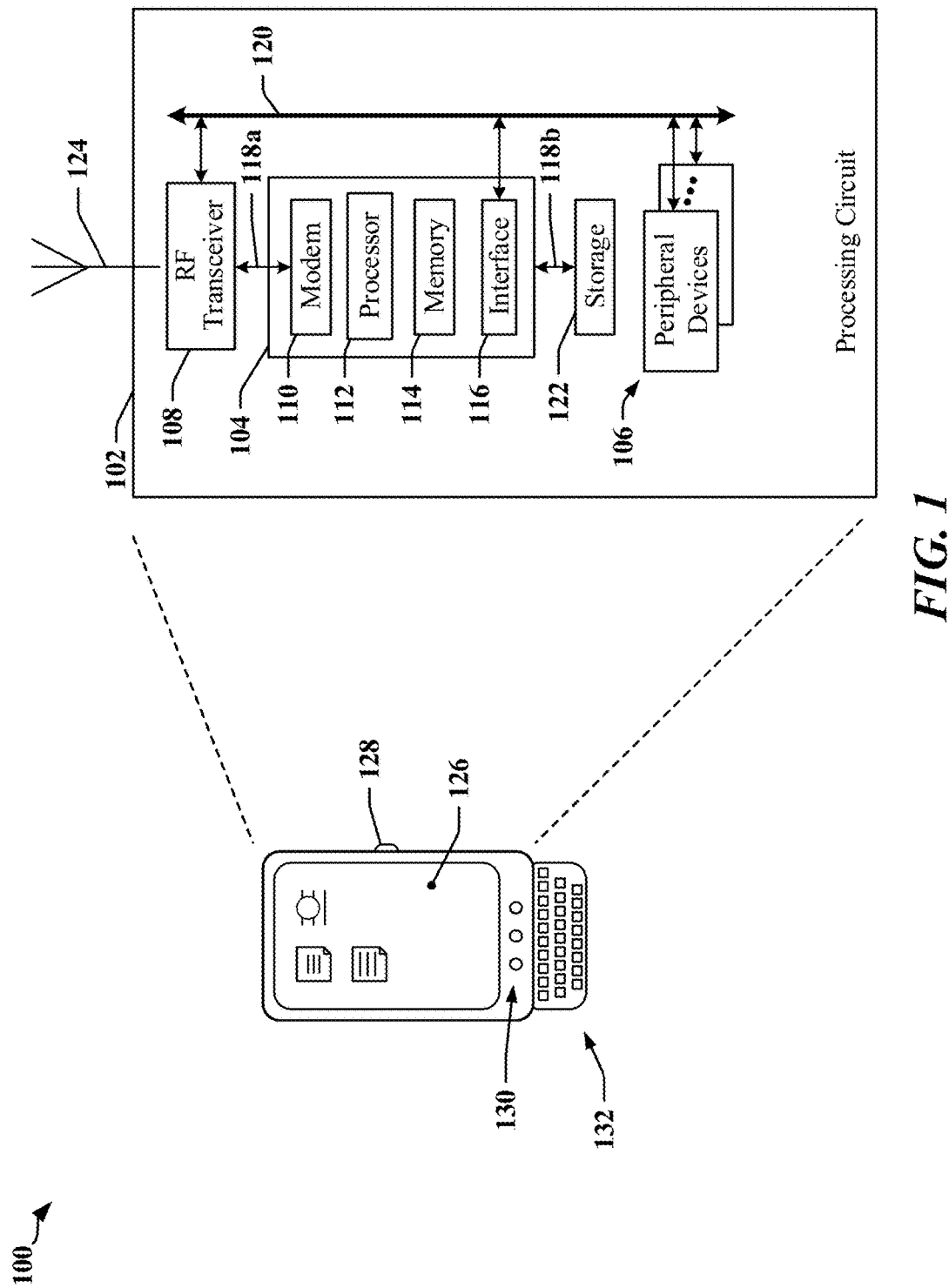
FIG. 1 depicts an apparatus employing a data link between IC devices that selectively operates according to one of a plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of data communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on, or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), Blu-Ray, and floppy disk where disks usually reproduce data magnetically, while discs reproduce data optically with lasers. Combinations of the above should also be included within the scope of computer-readable media.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
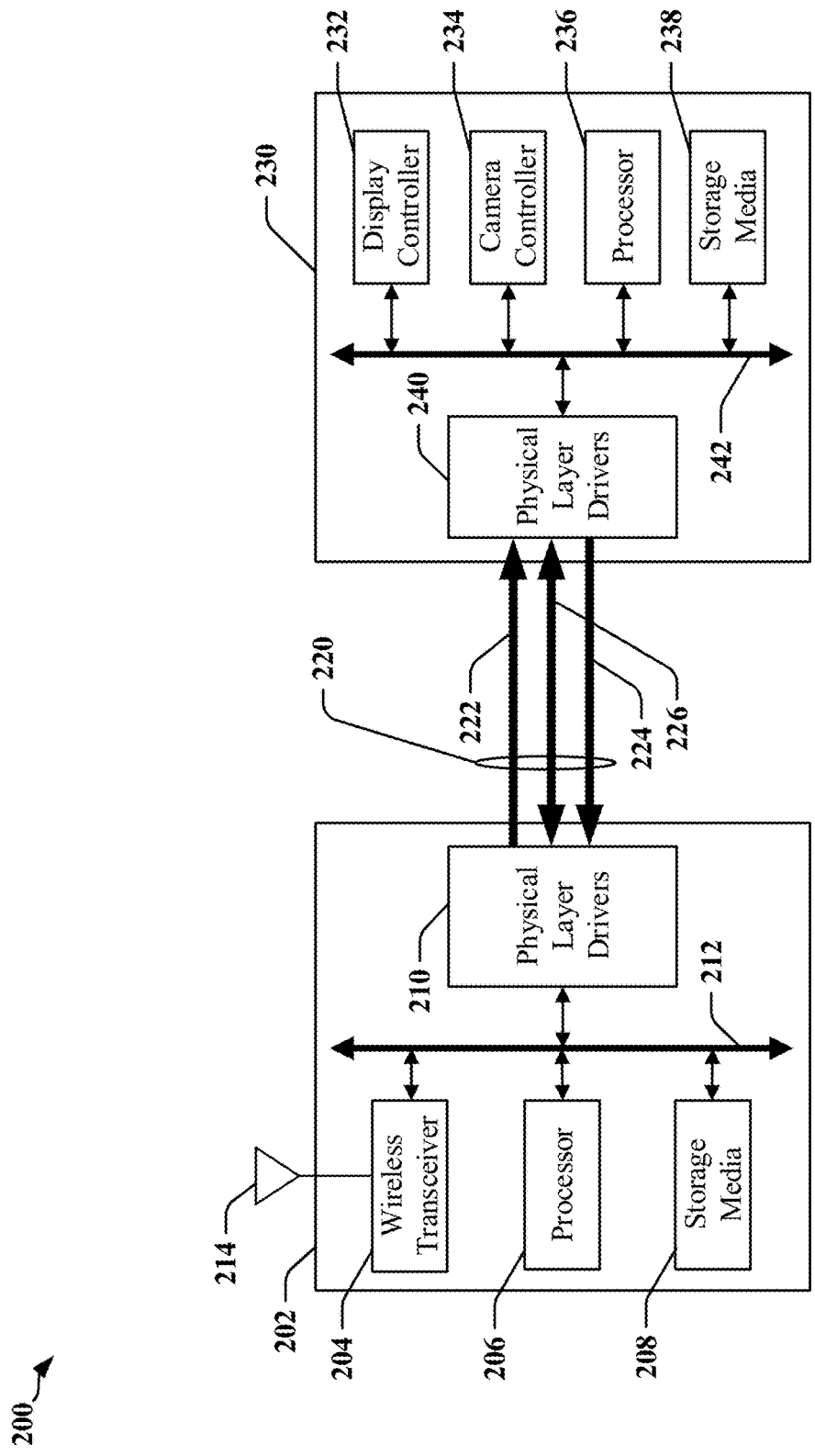
FIG. 2 illustrates a system architecture for an apparatus employing a data link between IC devices.

FIG. 2 is a block schematic diagram illustrating certain aspects of an apparatus 200 such as a mobile apparatus that employs a communication link 220 to connect various subcomponents. In one example, the apparatus 200 includes a plurality of IC devices 202 and 230 that exchange data and control information through the communication link 220. The communication link 220 may be used to connect IC devices 202 and 230 that are located in close proximity to one another, or physically located in different parts of the apparatus 200. In one example, the communication link 220 may be provided on a chip carrier, substrate or circuit board that carries the IC devices 202 and 230. In another example, a first IC device 202 may be located in a keypad section of a mobile computing device while a second IC device 230 may be located in a display section of mobile computing device. In another example, a portion of the communication link 220 may include a cable or optical connection.

The communication link 220 may provide multiple channels 222, 224 and 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In one example described herein, a first communication channel 222 may be referred to as a forward channel 222 while a second communication channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the communication link 220. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each have a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232. In the example, the second IC device 230 may be adapted to control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touchscreen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse channel 224 may be operated in the same manner as the forward channel 222, and the forward channel 222 and reverse channel 224 may be capable of transmitting at comparable speeds or at different speeds, where speed may be expressed as data transfer rate and/or clocking rates. The forward and reverse data transfer rates may be substantially the same or differ by orders of magnitude, depending on the application. In some applications, a single bidirectional channel 226 may support communications between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

In some instances, the forward and reverse channels 222 and 224 may be configured or adapted to support a wide video graphics array (WVGA) 80 frames per second LCD driver IC without a frame buffer, delivering pixel data at 810 Mbps for display refresh. In another example, the forward and reverse channels 222 and 224 may be configured or adapted to enable communications between with dynamic random access memory (DRAM), such as double data rate (DDR) synchronous DRAM (SDRAM). Encoding devices 210 and/or 230 may be configured to encode multiple bits per clock transition, and multiple sets of wires can be used to transmit and receive data from the SDRAM, control signals, address signals, and other signals.

The forward and reverse channels 222 and 224 may comply with, or be compatible with application-specific industry standards. In one example, the MIPI Alliance standard defines physical layer interfaces between an application processor IC device 202 and an IC device 230 that supports the camera or display in a mobile device. The MIPI Alliance standard includes specifications that govern the operational characteristics of products that comply with MIPI Alliance specifications for mobile devices. In some instances, the MIPI Alliance standard may define interfaces that employ complimentary metal-oxide-semiconductor (CMOS) parallel busses.

The MIPI Alliance defines standards and specifications that may address communications affecting all aspects of operations in a mobile device, including the antenna, peripherals, the modem and application processors. For example, the MIPI Alliance defines protocols for a camera serial interface (CSI) and a display serial interface (DSI). The MIPI Alliance CSI-2 specification defines a wired interface between a camera and Application Processor and the MIPI Alliance DSI or DSI-2 specification defines a wired interface between an Application Processor and a display. The low-level physical layer (PHY) interface in each of these applications can be the MIPI Alliance C-PHY or the MIPI Alliance D-PHY.

MIPI Alliance C-PHY Interface

According to certain aspects disclosed herein, certain systems and apparatus may employ multi-phase data encoding and decoding interface methods for communicating between IC devices 202 and 230. A multi-phase encoder may drive a plurality of conductors (i.e., M conductors). The M conductors typically include three or more conductors, and each conductor may be referred to as a wire, although the M conductors may include conductive traces on a circuit board or within a conductive layer of a semiconductor IC device. In one example, the C-PHY physical layer interface technology defined by the MIPI Alliance may be used to connect camera and display devices 230 to an application processor device 202. The C-PHY interface employs 3-phase symbol encoding to transmit data symbols on 3-wire lanes, or "trios" where each trio includes an embedded clock.

The M conductors may be divided into a plurality of transmission groups, each group encoding a portion of a block of data to be transmitted. An N-phase encoding scheme is defined in which bits of data are encoded in phase transitions and polarity changes on the M conductors. Decoding does not rely on independent conductors or pairs of conductors and timing information can be derived directly from phase and/or polarity transitions in the M conductors. N-Phase polarity data transfer can be applied to any physical signaling interface, including electrical, optical and radio frequency (RF) interfaces.

In the C-PHY example, a 3-phase encoding scheme for a 3-wire system may define three phase states and two polarities, providing 6 states and 5 possible transitions from each state. Deterministic voltage and/or current changes may be detected and decoded to extract data from the three wires.

Figure 3:
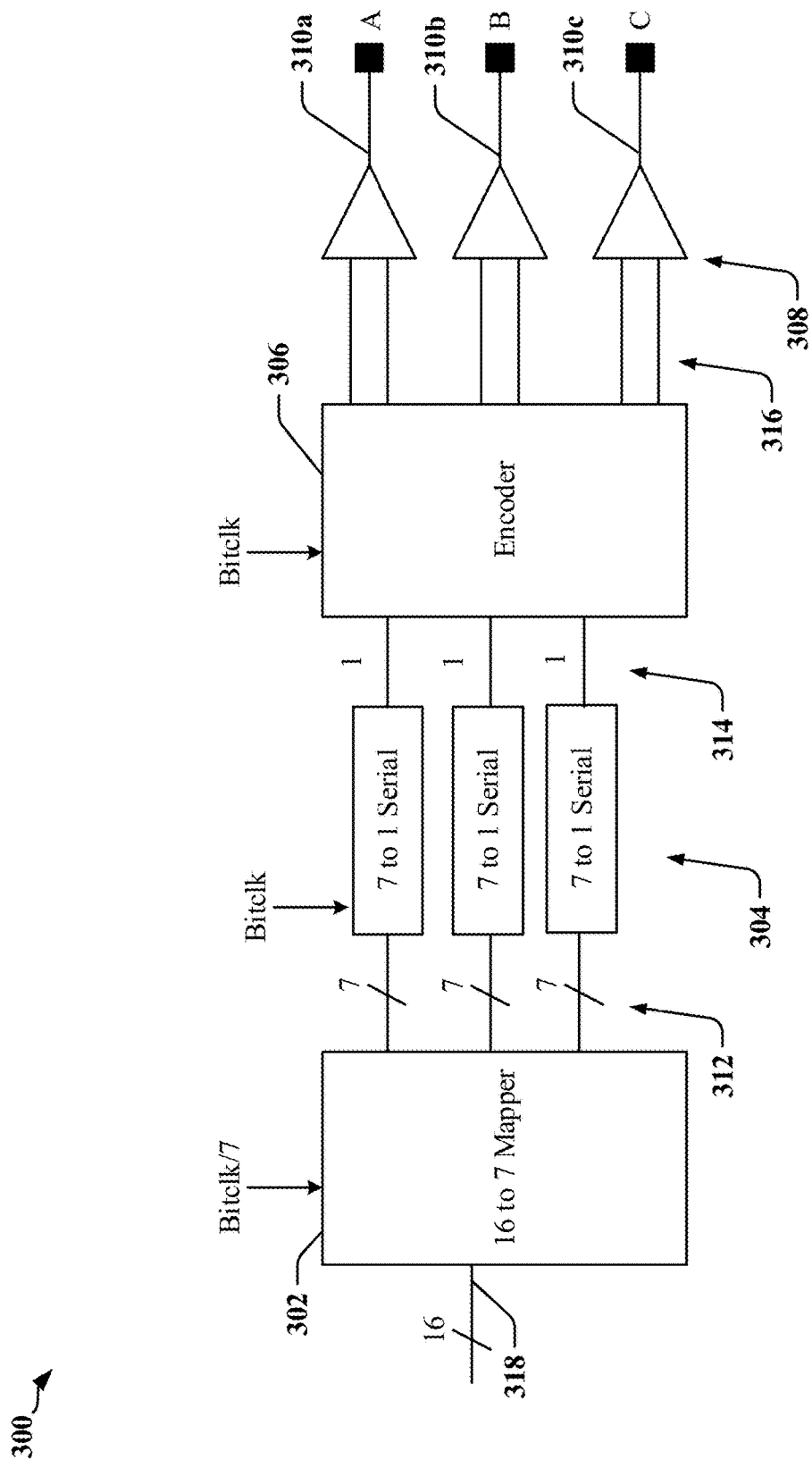
FIG. 3 illustrates an example of an N-phase polarity data encoder.

FIG. 3 is a schematic diagram illustrating the use of N-phase polarity encoding to implement certain aspects of the communication link 220 depicted in FIG. 2. The illustrated example may relate to a 3-wire link or to a 3-wire portion of a link that has more than three wires. The communication link 220 may include a wired bus having a plurality of signal wires, which may be configured to carry 3-phase encoded data in a high-speed digital interface, such as a mobile display digital interface (MDDI). One or more of the channels 222, 224 and 226 may be configured or adapted to use 3-phase polarity encoding. The physical layer drivers 210 and 240 may be adapted to encode and decode 3-phase polarity encoded data transmitted on the communication link 220. The use of 3-phase polarity encoding provides for high speed data transfer and may consume half or less of the power of other interfaces because fewer than 3 drivers are active in 3-phase polarity encoded communication links 220 at any time. 3-phase polarity encoding devices 210 and/or 240 can encode multiple bits per transition on the communication link 220. In one example, a combination of 3-phase encoding and polarity encoding may be used to support a wide video graphics array (WVGA), 80 frames per second LCD driver IC without a frame buffer, delivering pixel data for display refresh at 810 Mbps over three or more wires.

In the depicted C-PHY example 300, an M-wire, N-phase polarity encoding transmitter is configured for M=3 and N=3. The example of 3-wire, 3-phase encoding is selected solely for the purpose of simplifying descriptions of certain aspects of this disclosure. The principles and techniques disclosed for 3-wire, 3-phase encoders can be applied in other configurations of M-wire, N-phase polarity encoders, and may comply or be compatible with other interface standards.

When 3-phase polarity encoding is used, connectors such as signal wires 310a, 310b and 310c on a 3-wire bus may be undriven, driven positive, or driven negative. An undriven signal wire 310a, 310b or 310c may be in a high-impedance state. An undriven signal wire 310a, 310b or 310c may be driven or pulled to a voltage level that lies substantially halfway between the positive and negative voltage levels provided on driven signal wires. An undriven signal wire 310a, 310b or 310c may have no current flowing through it. In the example 300, each signal wire 310a, 310b and 310c may be in one of three states (denoted as +1, −1, or 0) using drivers 308. In one example, drivers 308 may include unit-level current-mode drivers. In another example, drivers 308 may drive opposite polarity voltages on two wires 310a and 310b while the third wire 310c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each symbol, the state of at least one signal wire 310a, 310b or 310c is changed from the symbol transmitted in the preceding transmission interval.

In the example, 300, a mapper 302 may receive 16 bit data 318, and the mapper 302 may map the input data 318 to 7 symbols 312 for transmitting sequentially over the signal wires 310a, 310b and 310c. An M-wire, N-phase encoder 306 configured for 3-wire, 3-phase encoding receives the 7 symbols 312 produced by the mapper one symbol 314 at a time and computes the state of each signal wire 310a, 310b and 310c for each symbol interval, based on the immediately preceding state of the signal wires 310a, 310b and 310c. The 7 symbols 312 may be serialized using parallel-to-serial converters 304, for example. The encoder 306 selects the states of the signal wires 310a, 310b and 310c based on the input symbol 314 and the previous states of signal wires 310a, 310b and 310c.

The use of M-wire, N-phase encoding permits a number of bits to be encoded in a plurality of symbols where the bits per symbol is not an integer. In the simple example of a 3-wire, 3-phase system, there are 3 available combinations of 2 wires, which may be driven simultaneously, and 2 possible combinations of polarity on any pair of wires that is driven simultaneously, yielding 6 possible states. Since each transition occurs from a current state, 5 of the 6 states are available at every transition. The state of at least one wire is typically required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 4:
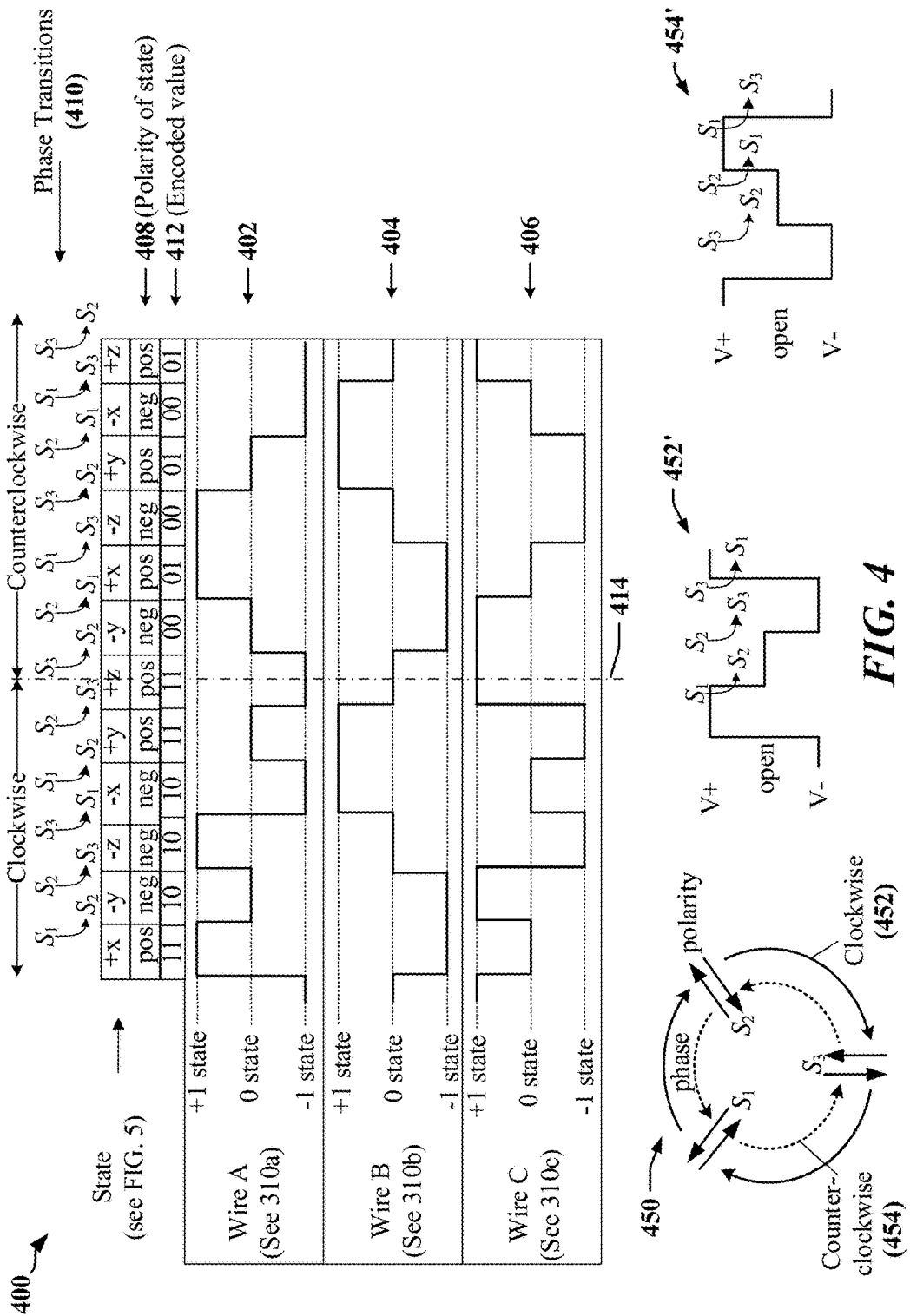
FIG. 4 illustrates signaling in an example of an N-phase polarity encoded interface.

FIG. 4 illustrates an example of signaling 400 employing a 3-phase modulation data-encoding scheme based on the circular state transition diagram 450. According to the data-encoding scheme, a 3-phase signal may rotate in two directions and may be transmitted on three wires 310a, 310b and 310c, identified as connectors A, B, and C. Each of the three signals is independently driven on the wires 310a, 310b, 310c. Each of the three signals includes the 3-phase signal, with each signal being 120 degrees out of phase relative to the other two signals. At any point in time, each of the three wires 310a, 310b, 310c is in a different one of the states {+1, 0, −1}. At any point in time, each of the three wires 310a, 310b, 310c in a 3-wire system is in a different state than the other two wires. When more than three conductors or wires are used, two or more pairs of wires may be in the same state. The illustrated encoding scheme may also encode information in the polarity of the two wires 310a, 310b and/or 310c that are actively driven to the +1 and −1 states. Polarity is indicated at 408 for the sequence of states depicted.

At any phase state in the illustrated 3-wire example, exactly two of the wires 310a, 310b, 310c carry a signal which is effectively a differential signal for that phase state, while the third wire 310a, 310b or 310c is undriven. The phase state for each wire 310a, 310b, 310c may be determined by voltage difference between the wire 310a, 310b or 310c and at least one other wire 310a, 310b and/or 310c, or by the direction of current flow, or lack of current flow, in the wire 310a, 310b or 310c. As shown in the state transition diagram 450, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counter-clockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In the example of a 3-wire, 3-phase communication link, clockwise rotations ($S_1$ to $S_2$), ($S_2$ to $S_3$), and/or ($S_3$ to $S_1$) at a phase transition 410 (between states) may be used to encode a logic 1, while counter-clockwise rotations ($S_1$ to $S_3$), ($S_3$ to $S_2$), and/or ($S_2$ to $S_1$) at the phase transition 410 may be used to encode a logic 0. Accordingly a bit may be encoded at each transition by controlling whether the signal is "rotating" clockwise or counter-clockwise. For example, a logic 1 may be encoded when the three wires 310a, 310b, 310c transition from phase state $S_1$ to phase state $S_2$ and a logic 0 may be encoded when the three wires 310a, 310b, 310c transition from phase state $S_1$ to phase state $S_3$. In the simple 3-wire example depicted, direction of rotation may be easily determined based on which of the three wires 310a, 310b, 310c is undriven before and after the transition.

Information may also be encoded in the polarity and/or changes of polarity of state 408 of the driven wires 310a, 310b, 310c, or in the direction of current flow or changes in the direction of current flow between two wires 310a, 310b, 310c. Signals 402, 404, and 406 illustrate voltage levels applied to wires 310a, 310b, 310c, respectively at each phase state in a 3-wire, 3-phase link. At any time, a first wire 310a, 310b, 310c is coupled to a more positive voltage (+V, for example), a second wire 310a, 310b, 310c is coupled to a more negative voltage (−V, for example), while the third wire 310a, 310b, 310c may be open-circuited. As such, one polarity encoding state may be determined by the current flow between the first and second wires 310a, 310b, 310c or the voltage polarities of the first and second wires 310a, 310b, 310c. In some embodiments, two bits of data 412 may be encoded in each phase transition 410. A decoder may determine the direction of signal phase rotation to obtain the first bit. The second bit may be determined based on the polarity difference between two of the signals 402, 404 and 406. In some instances, the second bit may be determined based on a change or lack of change in polarity of the differential signal transmitted on a pair of the wires 310a, 310b, 310c. The decoder having determined direction of rotation can determine the phase state and the polarity of the voltage applied between the two active wires 310a, 310b and/or 310c, or the direction of current flow through the two active wires 310a, 310b and/or 310c.

In the example of the 3-wire, 3-phase link described herein, one bit of data may be encoded in the rotation, or phase change in the 3-wire, 3-phase link, and an additional bit may be encoded in the polarity or changes in polarity of two driven wires. Certain embodiments, encode more than two bits in each transition of a 3-wire, 3-phase encoding system by allowing transition to any of the possible states from a current state. Given three rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols.

In one example, an encoder may transmit symbols using 6 wires with two pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| ABCD | ABCE | ABCF | ABDE | ABDF |
| ABEF | ACDE | ACDF | ACEF | ADEF |
| BCDE | BCDF | BCEF | BDEF | CDEF |

Of the 4 wires driven, the possible combinations of two wires driven positive (and the other two must be negative). The combinations of polarity may include:

| + + − − | + − − + | + − + − | − + − + | − + + − | − − + + |

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right).$$

Figure 5:
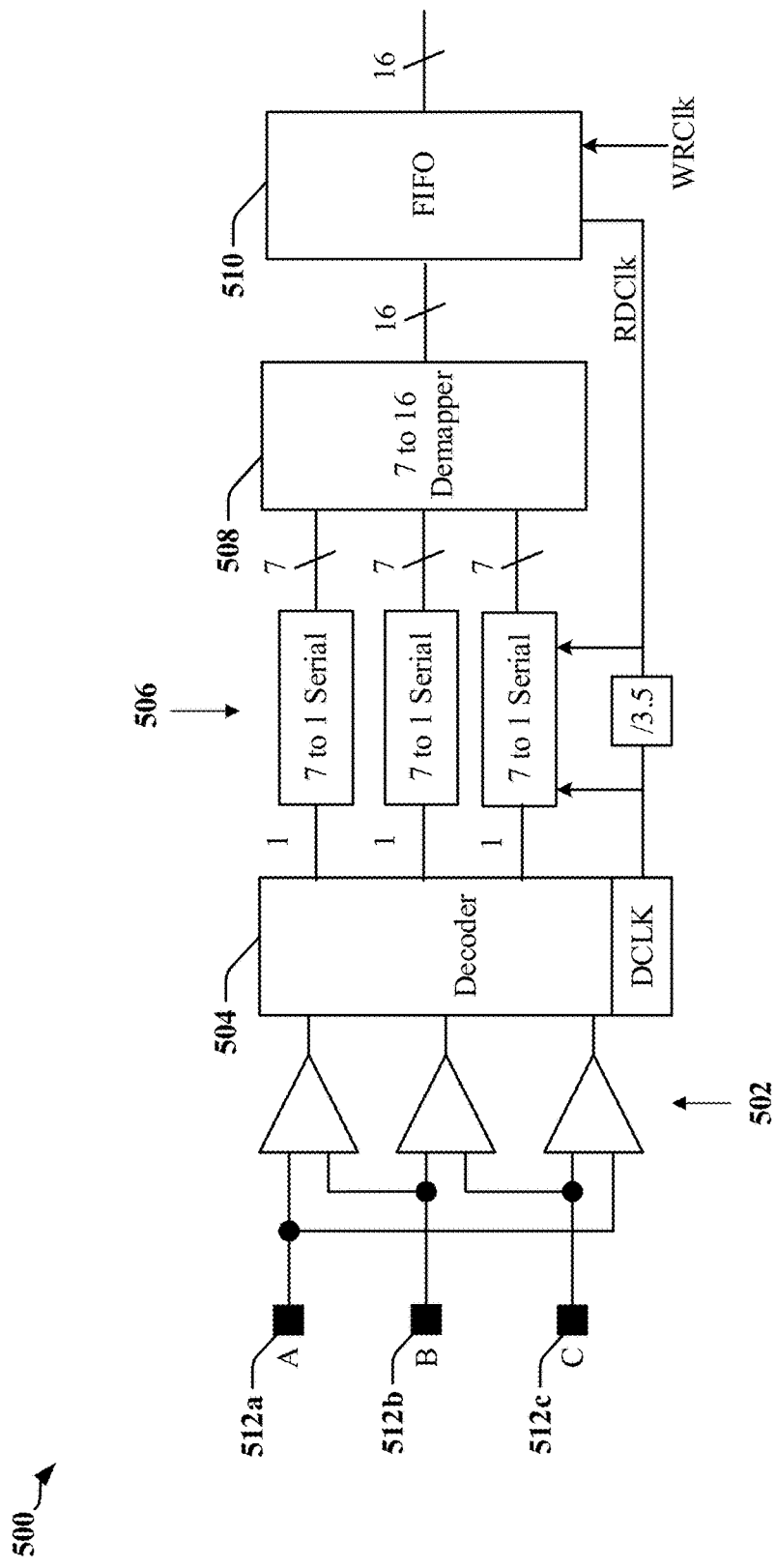
FIG. 5 illustrates an example of an N-phase polarity decoder.

FIG. 5 illustrates an example 500 of a receiver in a 3-wire, 3-phase PHY. The 3-wire, 3-phase example is illustrative of certain principles of operation applicable to other configurations of M-wire, N-phase receivers. Comparators 502 and a decoder 504 are configured to provide a digital representation of the state of each of three transmission lines 512a, 512b and 512c, as well as the change in the state of the three transmission lines compared to the state transmitted in the previous symbol period. Seven consecutive states are assembled by serial-to-parallel converters 506 to produce a set of 7 symbols to be processed by demapper 508 to obtain 16 bits of data that may be buffered in a first-in-first-out (FIFO) register 510, or the like.

Figure 6:
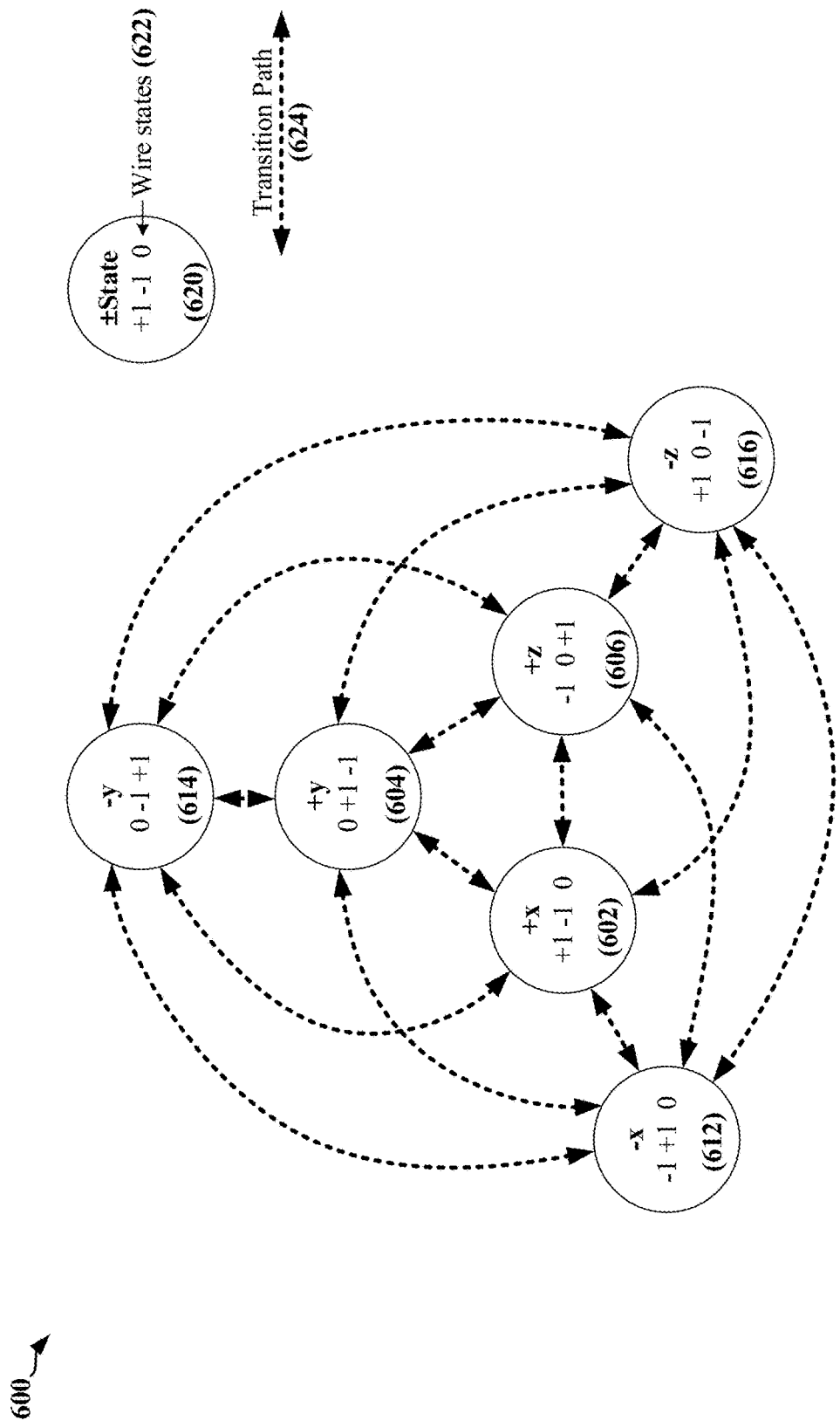
FIG. 6 is a state diagram illustrating the possible state transitions in the example of a 3-wire, 3-phase communication link.

FIG. 6 is a state diagram 600 illustrating 6 states and 30 possible state transitions in the example of a 3-wire, 3-phase communication link. The communication link may be operated in accordance with MIPI Alliance C-PHY protocols, for example. The signaling state of the communication link is defined by symbols transmitted for a duration of time (the symbol transmission interval) that is defined by a transmission clock used by a transmitter. The signaling state of the communication link may be characterized as the phase and polarity of a 3-phase signal that is transmitted on each of the three wires of the communication link, where each wire carries a version of the 3-phase signal that is phase-shifted with respect to the other two wires. The phase shift may be nominally set to 120°. That is, for each symbol transmission interval, the signal transmitted on each wire is in a different phase than the signals transmitted on the other two wires. The three phases may include two opposite polarity signaling states and an undriven state. In one example, the three states include a +V state, a 0V state and a −V state. In another example, the three states include a +V state, a +V/2 state and a 0V state, where the +V/2 may be the undriven state. A 3-phase signal may provide three possible phase states {P1, P2, P3}, and the 3-phase signal may rotate in two directions: P1→P2→P3→P1 or P1→P3→P2→P1. In general, a current symbol defines a first signaling state of the three wires, and the next symbol defines a second signaling state of the three wires, where at least one wire changes signaling state between the first and second signaling states.

FIG. 6 expands on the state transition diagram 450 in FIG. 4 by depicting all possible states 602, 604, 606, 612, 614 and 616 and illustrates the operation of one example of transition encoding with respect to the individual states 602, 604, 606, 612, 614 and 616. The possible states 602, 604, 606, 612, 614 and 616 include positive-polarity and negative-polarity versions of the phase states $S_1$, $S_2$ and $S_3$ illustrated in the state transition diagram 450 of FIG. 4. For clarity, the set of phase/polarity states are labeled alphabetically and includes {+x, −x, +y, −y, +z, −z} where, for example, +x and −x represent states with the same phase state but different polarity. As shown in the model state element 620, each state 602, 604, 606, 612, 614 and 616 in the state diagram 600 includes a field 622 showing the voltage state of signals 402, 404 and 406, which are transmitted on wires 310a, 310b and 310c, respectively. For example, in state 602 (+x) signal 402=+1, signal 404=−1 and signal 406=0.

Also shown in FIG. 6 are the possible transition paths (see, for example, the model transition path 624) between the states 602, 604, 606, 612, 614 and 616. As noted herein, clock information may be embedded in 3-phase signals by ensuring that a transition in signaling state of the communication link occurs at the boundary between each pair consecutively transmitted symbols. Five possible transitions are available from any current state 602, 604, 606, 612, 614 or 616.

Encoding in a MIPI Alliance C-PHY Interface

Figure 7:
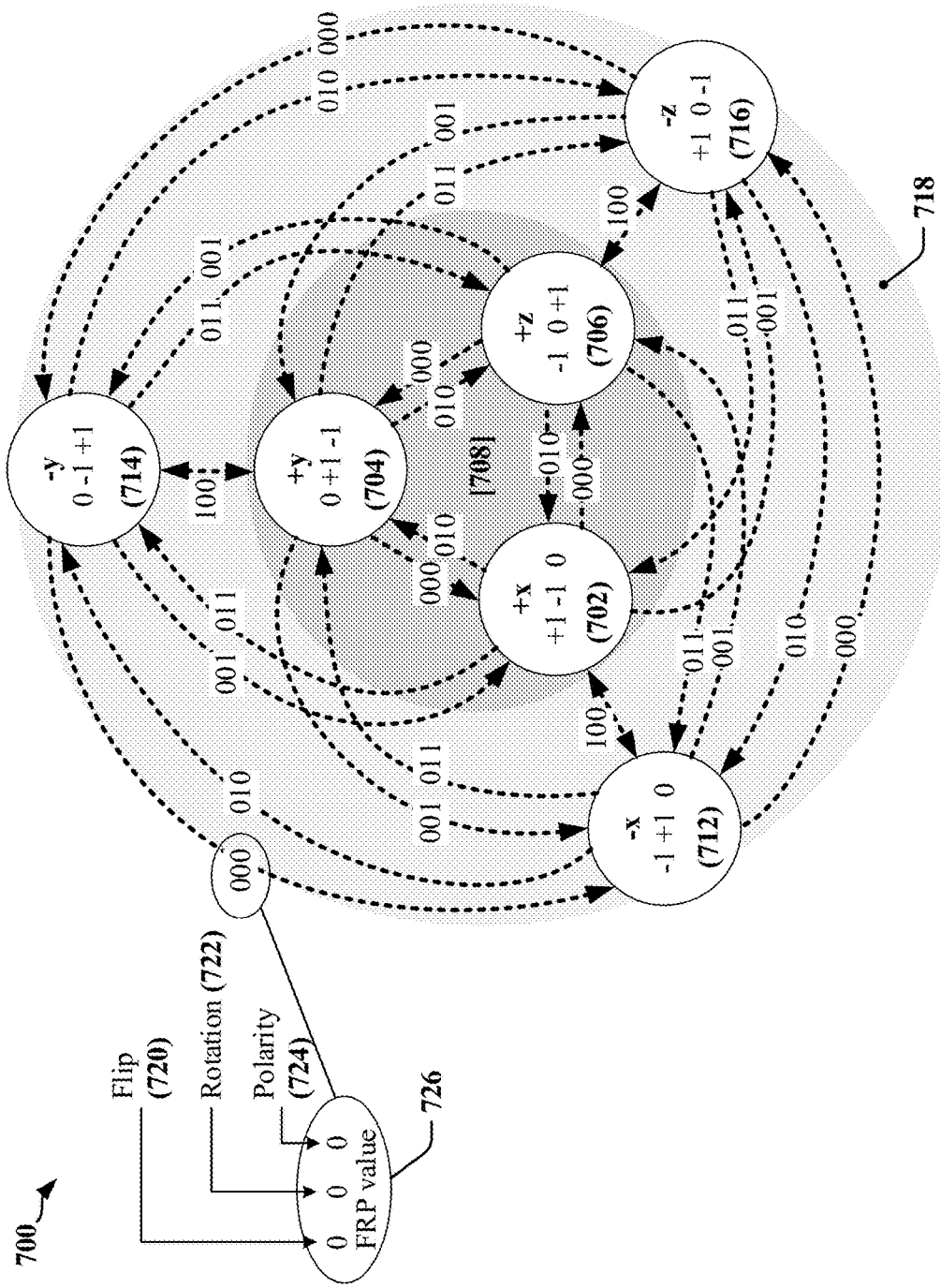
FIG. 7 is state diagram illustrating all possible signaling states and transitions in a 3-wire 3-phase interface that provides 5 available state transitions at each symbol interval in accordance with certain aspects disclosed herein.

FIG. 7 is state diagram 700 illustrating the possible signaling states 702, 704, 706, 712, 714, 716 of the three wires in a 3-wire, 3-phase interface, including in a MIPI Alliance C-PHY high-speed mode interface for example. All possible transitions from each state 702, 704, 706, 712, 714, 716 are illustrated. The transitions in the state diagram 700 can be represented by a Flip, Rotate, Polarity (FRP) symbol 726 that has one of the three-bit binary values in the set: {000, 001, 010, 011}. The Rotation bit 722 of the FRP symbol 726 indicates the direction of phase rotation associated with a transition to a next state. The Polarity bit 724 of the FRP symbol 726 is set to binary 1 when a transition to a next state involves a change in polarity. When the Flip bit 720 of the FRP symbol 726 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 726 corresponds to wire state changes for each transition. The state diagram 700 may be separated into an inner circle 708 that includes the positive polarity states 702, 704, 706 and an outer circle 718 that encompasses the negative polarity states 712, 714, 716.

Figure 8:
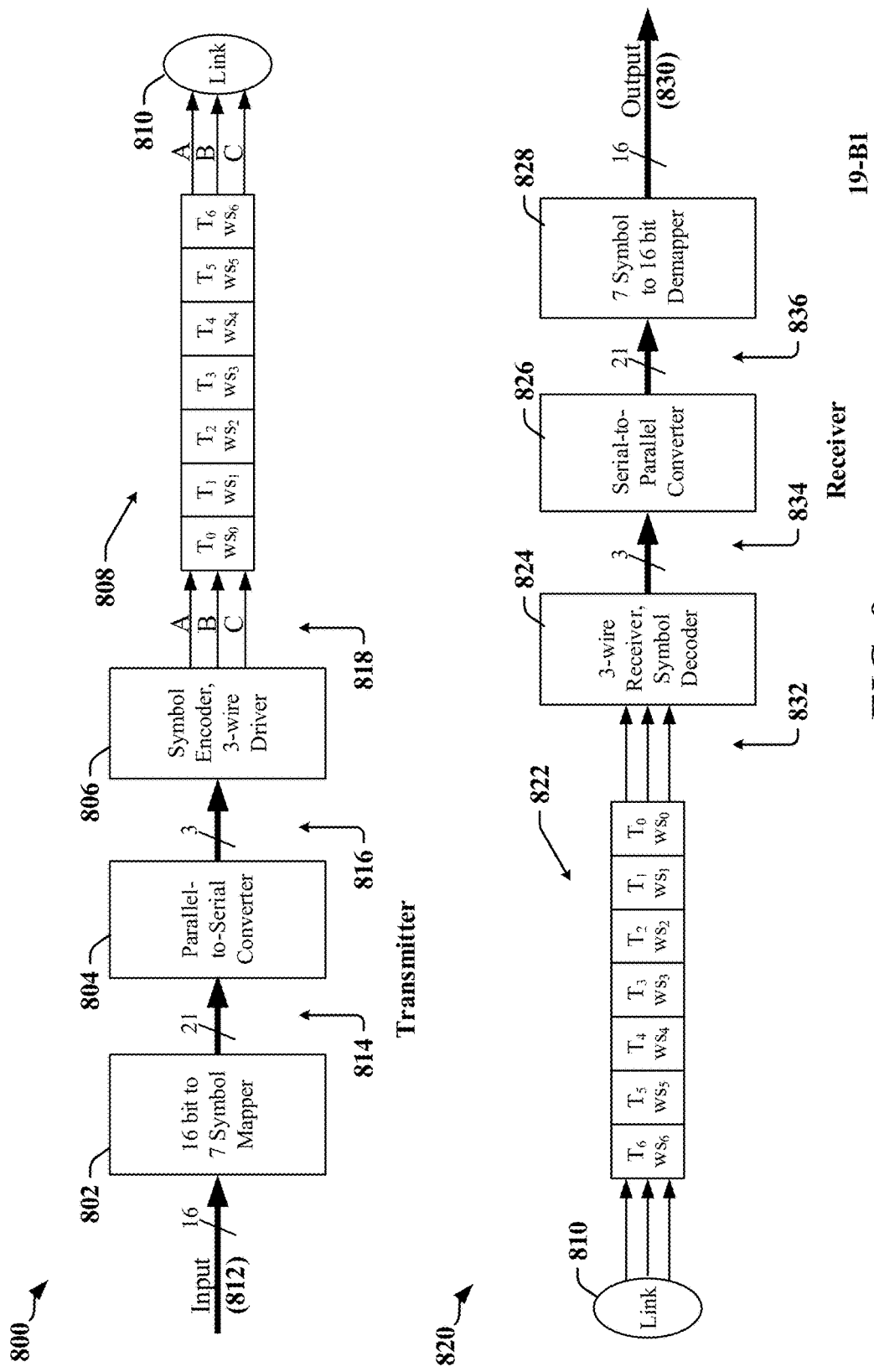
FIG. 8 illustrates a transmitter and a receiver in a 3-wire, 3-phase interface that provides 5 available state transitions, and that may be adapted in accordance with certain aspects disclosed herein.

FIG. 8 illustrates a transmitter 800 and a receiver 820 configured for a 3-wire, 3-phase interface that may use the FRP symbol 726 to select a next signaling state for transmission based on the immediately preceding signaling state. A 16-bit data word is received as an input 812 to a Mapper 802 in the transmitter 800. The Mapper 802 maps the 16-bit data to a 21-bit word representative of 7 FRP symbols. The 7 FRP symbols are provided in a sequence of 3-bit symbols 816 using a Parallel-To-Serial converter 804. Each symbol in the sequence of 3-bit symbols 816 may be provided to a Symbol Encoder/Driver 806 configured to produce a sequence of signaling states 808 on 3-wire data link 810.

At the receiver 820, a Receiver/Symbol Decoder 824 decodes a sequence of signaling states 822 received from the 3-wire data link 810. The Receiver/Symbol Decoder 824 produces a sequence of FRP symbols 834 that is provided to a Serial-to-Parallel Converter 826, which in turn provides a 21-bit word to a Demapper 828. The 16-bit output 830 of the Demapper 828 corresponds to the input 812 of the transmitter 800.

The transmitter 800 and receiver 820 may be operated to obtain an optimal encoding of 16-bit data, by mapping 16-bit words to 7-symbol sequences, where symbols maximize the number of signaling states 702, 704, 706, 712, 714, 716 of the three wires in a 3-wire, 3-phase interface available for encoding purposes at each symbol transition. In the example illustrated in FIG. 7, six signaling states 702, 704, 706, 712, 714, 716 are defined, with 5 possible transitions from each of the signaling states 702, 704, 706, 712, 714, 716. It will be appreciated that this encoding scheme results in a non-integer conversion ratio of 16/7~=2.285 bits per symbol and, consequently, ~2.285 bits per transition. In some implementations, it may be desirable to obtain the benefit of 3-wire, 3-phase encoding with an integer conversion ratio.

3-Phase Encoding Using Integer Encoding Rates

Figure 9:
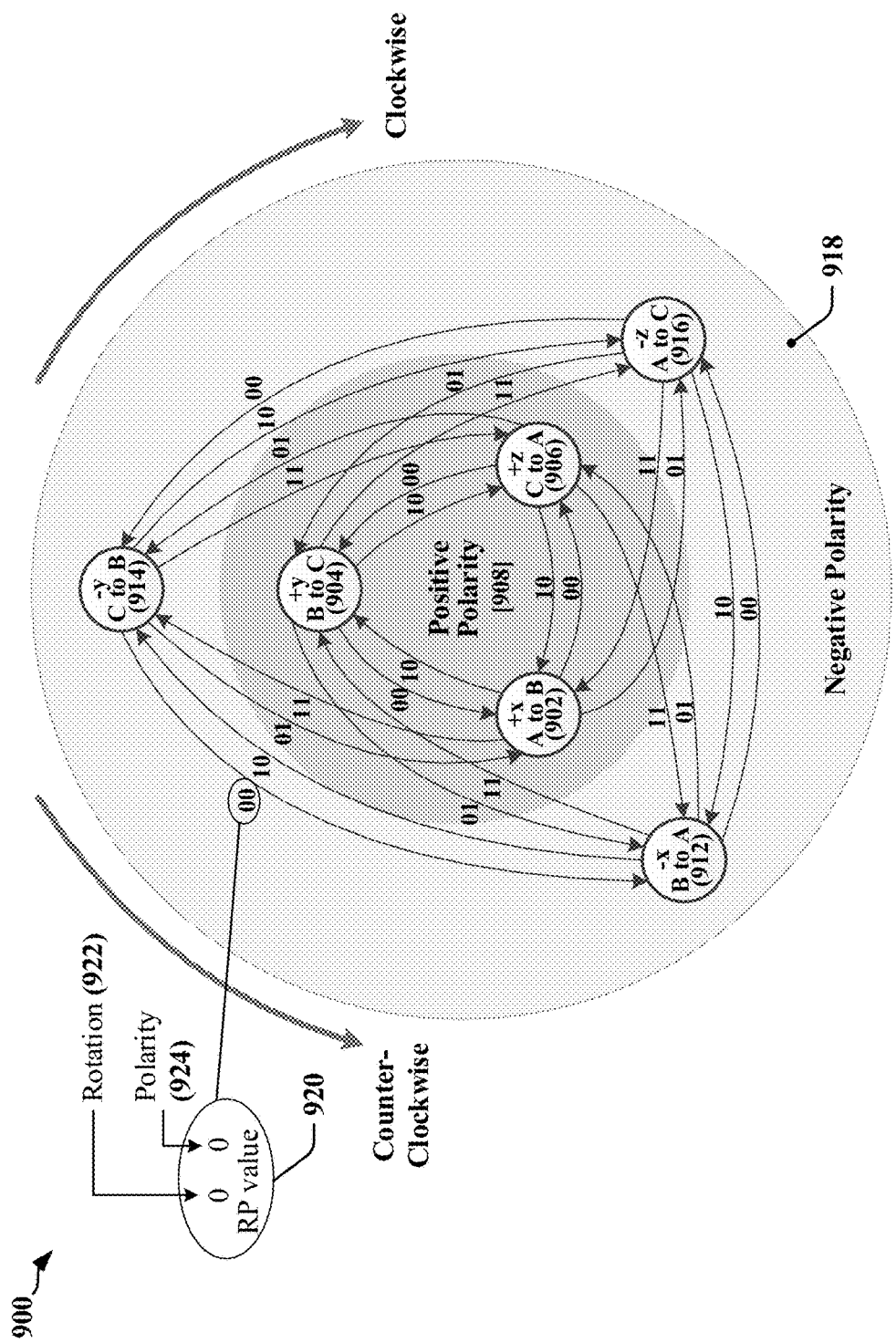
FIG. 9 is state diagram illustrating all possible signaling states and transitions in a 3-wire 3-phase interface that provides 4 available state transitions at each symbol interval in accordance with certain aspects disclosed herein.

According to certain aspects, data may be encoded using fewer than all possible transitions. FIG. 9 is state diagram 900 illustrating the signaling states 902, 904, 906, 912, 914, 916 on the three wires of a 3-wire, 3-phase communication link, with fewer available transitions from each signaling state 902, 904, 906, 912, 914, 916 than the maximum possible transitions illustrated in FIG. 7. Here, four transitions are available from each signaling state 902, 904, 906, 912, 914, 916. The transitions in the state diagram 900 can be represented by a two-bit Rotate, Polarity (RP) symbol 920 that has one of the two-bit binary values in the set: {00, 01, 10, 11}. The Rotation bit 922 of the RP symbol 920 indicates the direction of phase rotation associated with a transition to a next state. The Polarity bit 924 of the RP symbol 920 is set to binary 1 when a transition to a next state involves a change in polarity. The Flip bit 720 of FIG. 7 is not used in the encoding scheme represented by the state diagram 900, eliminating direct transitions between: the +x state 902 and the −x state 912; the +y state 904 and the −y state 914; and the +z state 906 and the −z state 916. A flip represents a state transition that involves only a change in polarity. The RP symbol 920 corresponds to wire state changes for each transition. The state diagram 900 may be separated into an inner circle 908 that includes the positive polarity states 902, 904, 906 and an outer circle 918 that encompasses the negative polarity states 912, 914, 916.

Figure 10:
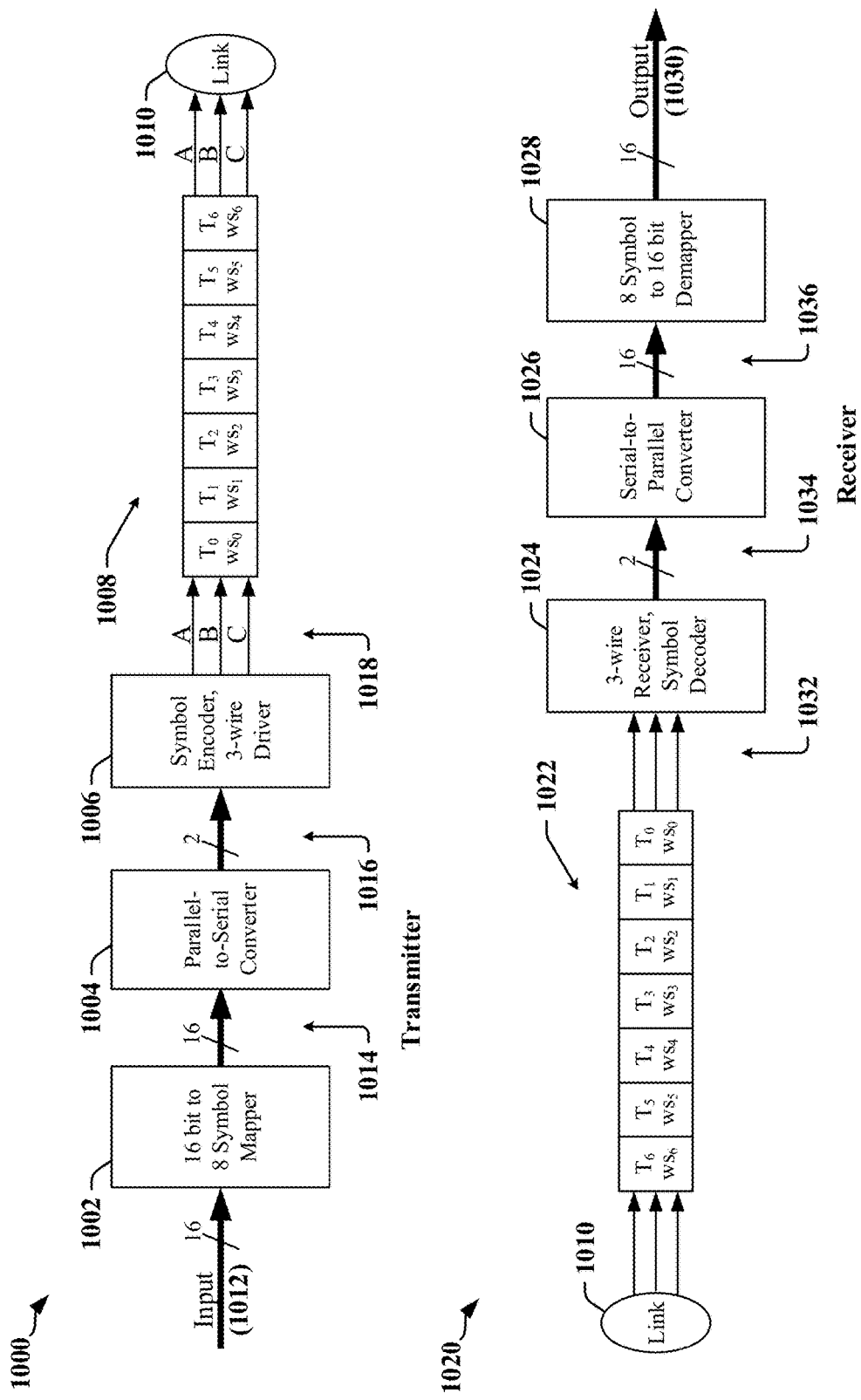
FIG. 10 illustrates a transmitter and a receiver in a 3-wire, 3-phase interface that provides 4 available state transitions in accordance with certain aspects disclosed herein.

FIG. 10 illustrates a transmitter 1000 and a receiver 1020 configured for a 3-wire, 3-phase interface that operates with a reduced number of available transitions from each signaling state 902, 904, 906, 912, 914, 916. A 16-bit data word is received as an input 1012 to a Mapper 1002 in the transmitter 1000. The Mapper 1002 maps the 16-bit data to a 16-bit word representative of 8 symbols. The 8 symbols are provided in a sequence of 2-bit symbols 1016 using a Parallel-To-Serial converter 1004. Each symbol in the sequence of 2-bit symbols 1016 may be provided as, or used to provide an RP symbol 920 that can be input to a Symbol Encoder/Driver 1006 configured to produce a sequence of signaling states 1008 on a 3-wire link 1010.

At the receiver 1020, a Receiver/Symbol Decoder 1024 decodes a sequence of RP symbols 1022 received from the 3-wire link 1010. The Receiver/Symbol Decoder 1024 produces a sequence of RP symbols 1022 that is provided to a Serial-to-Parallel Converter 1026, which in turn provides a 16-bit word to a Demapper 1028. The 16-bit output 1030 of the Demapper 1028 corresponds to the input 1012 of the transmitter 1000.

The encoding scheme illustrated in FIGS. 9 and 10 provides an integer conversion ratio of 2 bits per symbol and, consequently, 2 bits per transition. The use of 3-wire, 3-phase encoding can provide a form of differential signaling that is more tolerant of external noise sources, since nose induced or coupled to the wires is effectively common-mode noise that has minimal effect at the decoder. Noise can have a greater impact on a conventional three-wire link that transmits data in two data signals in accordance with a one-wire clock signal.

MIPI Alliance C-PHY Wiring Misalignment

Figure 11:
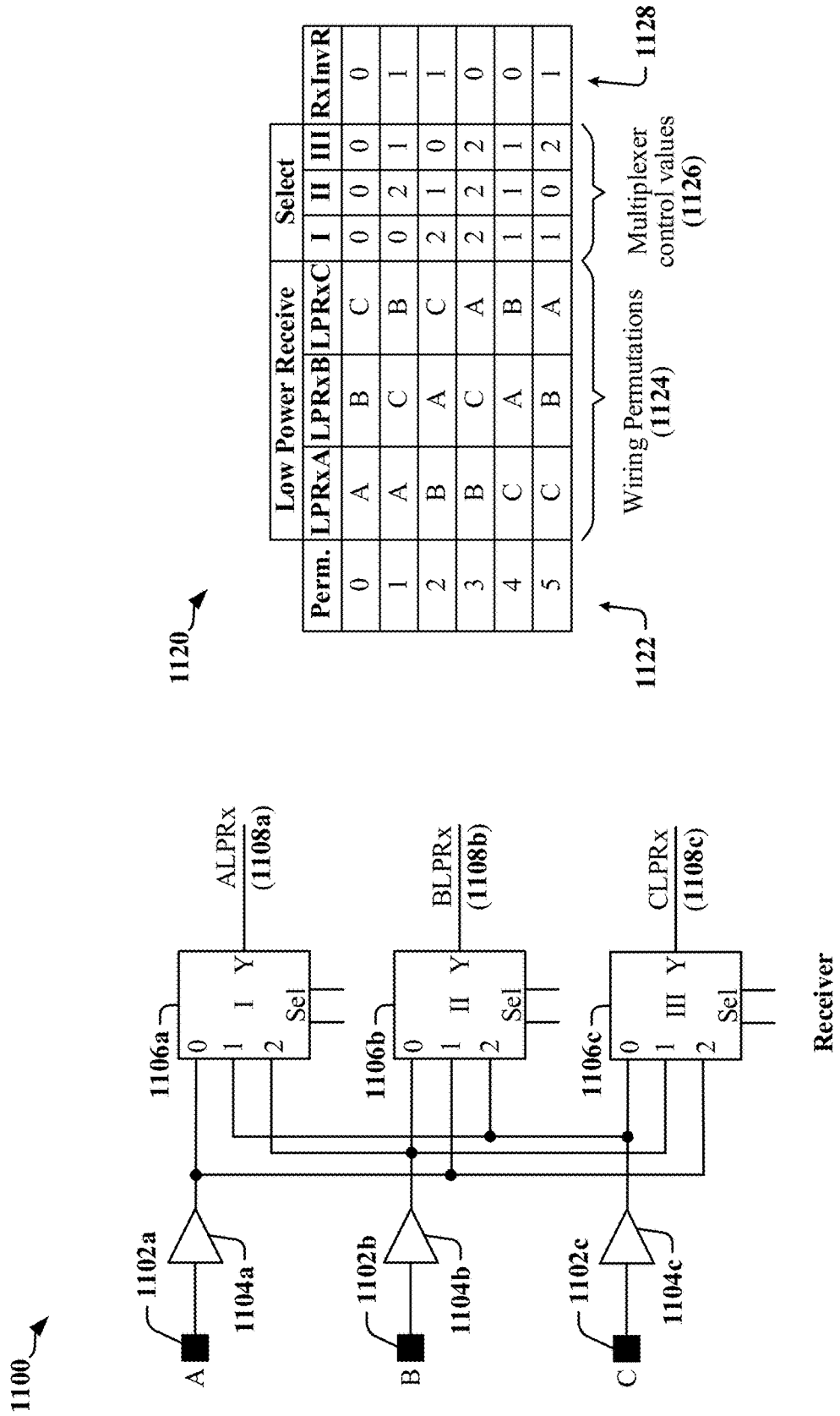
FIG. 11 illustrates an example of a receiver that supports communication over misaligned wires in a 3-wire interface according to certain aspects disclosed herein.

MIPI Alliance C-PHY interfaces may be used to interconnect various IC devices within a device, on a chip carrier, circuit board, or the like. In some instances, there may be limited options for positioning and/or routing of wires, traces, or other connectors. In such instances, it may be preferable or necessary to connect inputs of a first device to the outputs of a second device coupled to the multi-wire interface without regard to functional alignment of the inputs and outputs. FIG. 11 illustrates an example of a receiver 1100 that can support communication over misaligned wires 1102a, 1102b, 1102c (A, B, and C) in a 3-wire interface, and FIG. 12 illustrates an example of a transmitter 1200 that can support communication over misaligned wires 1202a, 1202b, 1202c (A, B, and C) in a 3-wire interface.

Figure 12:
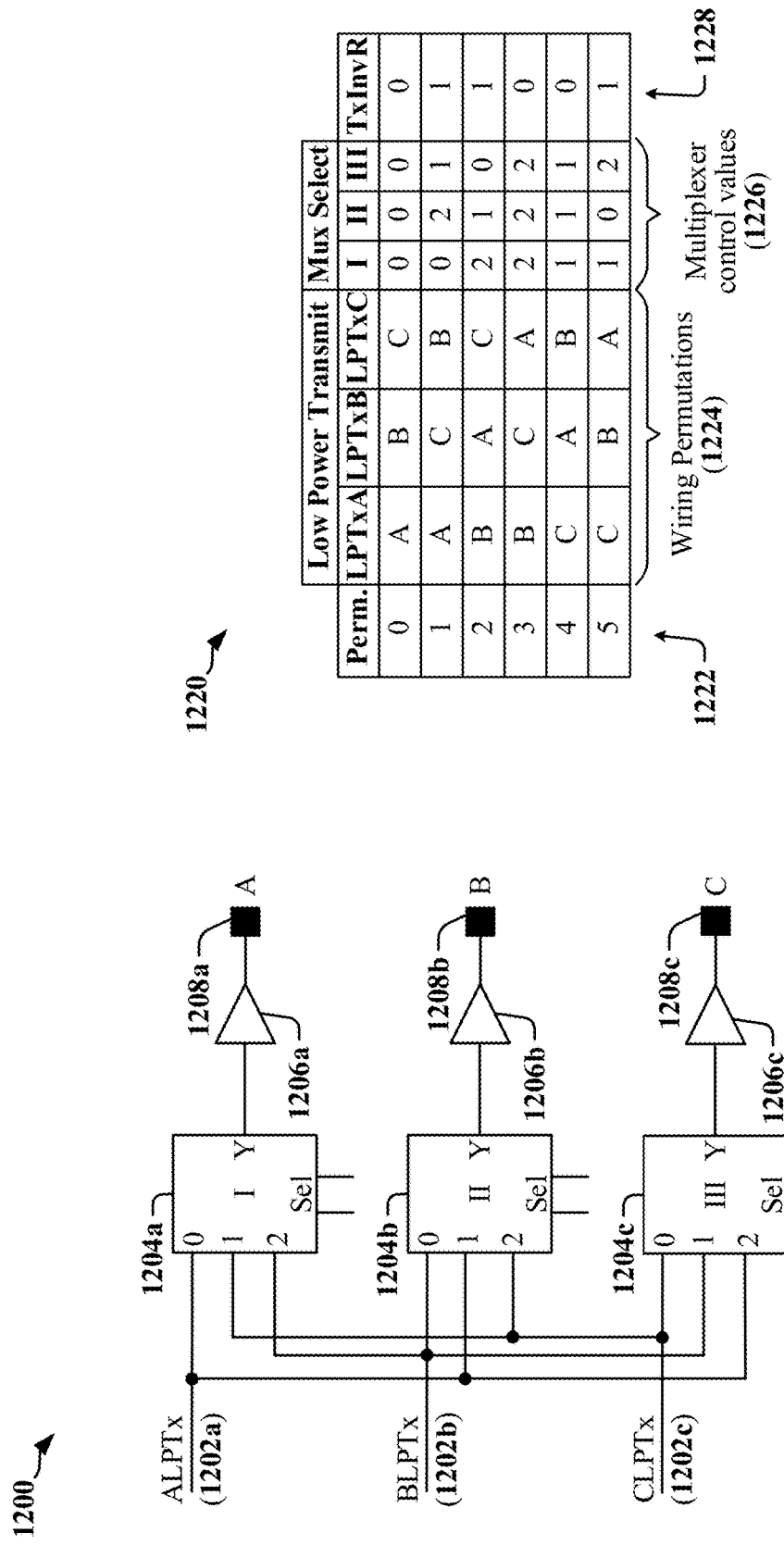
FIG. 12 illustrates an example of a transmitter that supports communication over misaligned wires in a 3-wire interface according to certain aspects disclosed herein.

In one example, the receiver 1100 of FIG. 11 may be coupled to the transmitter 1200 of FIG. 12 such that the A input of the receiver 1100 is connected to the C output of the transmitter 1200, the B input of the receiver 1100 is connected to the B output of the transmitter 1200, and the C input of the receiver 1100 is connected to the A output of the transmitter 1200, in a configuration that may be referred to as an CBA configuration. When the 3-wire interface is configured for single-ended operation, in a low-power mode of the C-PHY interface for example, multiplexers 1106a, 1106b, 1106c may be employed to realign the three wires 1102a, 1102b, 1102c. In the CBA example, the multiplexers 1106a, 1106b, 1106c may be controlled to produce an ABC alignment of inputs to the symbol decoding logic. The multiplexers 1106a, 1106b, 1106c may be provided between line receivers 1104a, 1104b, 1104c and a symbol decoding logic and circuits.

FIG. 11 includes a table 1120 that shows selection values 1126 that may be used to control the multiplexers 1106a, 1106b, 1106c for the possible wiring permutations 1124 in a 3-wire interface, where each permutation is identified by a permutation number 1122. In addition, the table indicates the state of an inversion control signal 1128 provided in accordance with certain aspects disclosed herein.

In the example illustrated in FIG. 12, the transmitter 1200 may be coupled to a receiver 1100 such that the A output of the transmitter 1200 is connected to the B input of the receiver 1100, the B output of the transmitter 1200 is connected to the C input of the receiver 1100, and the C output of the transmitter 1200 is connected to the A input of the receiver 1100, in a configuration that may be referred to as an BCA configuration. When the 3-wire interface is configured for single-ended operation, in a low-power mode of the C-PHY interface for example, multiplexers 1206a, 1206b, 1206c may be employed to realign the three wires 1202a, 1202b, 1202c. In the BCA example, the multiplexers 1206a, 1206b, 1206c may be controlled to produce an ABC configuration for transmission on the 3-wires. The multiplexers 1206a, 1206b, 1206c may be provided between line receivers 1204a, 1204b, 1204c and a symbol decoding logic and circuits.

FIG. 12 includes a table 1220 that shows selection values 1226 that may be used to control the multiplexers 1206a, 1206b, 1206c for the possible wiring permutations 1224 in a 3-wire interface, where each permutation is identified by a permutation number 1222. In addition, the table indicates the state of an inversion control signal 1228 provided in accordance with certain aspects disclosed herein.

Misalignments may be corrected by controlling the multiplexers 1106a, 1106b, 1106c of the receiver 1100 and/or the multiplexers 1206a, 1206b, 1206c of the transmitter 1200. For example, a misalignment may be corrected if only one device is equipped with a receiver 1100 and/or a transmitter 1200 with corresponding multiplexers 1106a, 1106b, 1106c and 1206a, 1206b, 1206c. When both devices are equipped with a receiver 1100 and/or a transmitter 1200 capable of correcting misalignments, one device may be assigned responsibility for correcting misalignment (e.g., the receiving device or transmitting device may be responsible). In some instances, both devices may operate their respective receivers 1100 and/or transmitters 1200 to match a wiring configuration of the 3-wire interface. That is, both devices may control their respective multiplexers 1106a, 1106b, 1106c and/or 1206a, 1206b, 1206c to align internal connectors with a predefined wiring configuration of the 3-wire link.

Figure 13:
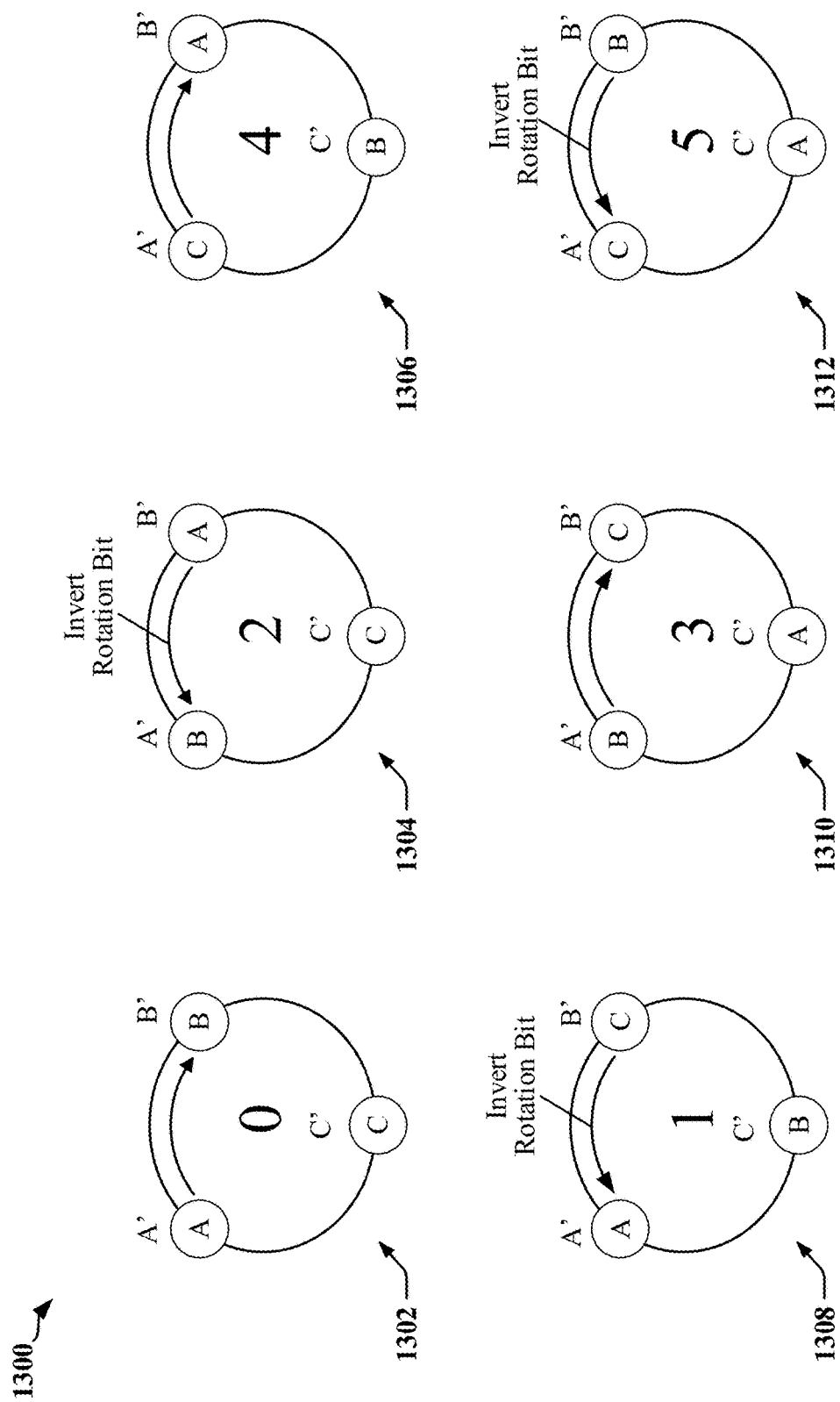
FIG. 13 is a diagram that illustrates certain aspects of 3-Phase coding that may be leveraged to correct for various effects of misaligned wires in accordance with certain aspects disclosed herein.

According to certain aspects disclosed herein, wiring misalignments in a 3-phase, 3-wire interface may be corrected without the use of multiplexers, a switch matrix, or the like. FIG. 13 is a diagram 1300 that illustrates certain aspects of 3-Phase coding that may be leveraged to correct misaligned signals. In the diagram 1300 the A, B and C wires of a 3-phase trio are represented as points on circles 1302, 1304, 1306, 1308, 1310, 1312 that collectively represent all six possible permutations of the three wires. The circles 1302, 1304, 1306, 1308, 1310, 1312 include a numerical identification corresponding to the permutation numbers 1122, 1222 identified in FIGS. 11 and 12. On each circle 1302, 1304, 1306, 1308, 1310, 1312, an aligned configuration of wires (i.e., the aligned wires A', B', C') in a properly aligned interface is provided alongside the configuration of wires represented by the circle 1302, 1304, 1306, 1308, 1310, 1312.

With reference also to FIG. 7, polarity changes at symbol transitions result in the same change in polarity state regardless of the permutation of wires. That is, a change from a positive polarity state 702, 704, or 706 (i.e. the inner circle 708) to a negative polarity state 712, 714, or 716 (i.e. the outer circle 718) generates the same property that defines the Polarity bit 724 and Flip bit 720 of the FRP symbol 726.

The Rotation bit 722 of the FRP symbol 726 is not affected by misalignments that result in the clockwise (or counter-clockwise) order of states being preserved as a result of wire permutation. For example, the clockwise order of the wires remains constant for the ABC, BCA and CAB configurations, which are represented as the '0' permutation (circle 1302), the '3' permutation (circle 1310), and the '4' permutation (circle 1306). The Rotation bit 722 of the FRP symbol 726 is inverted by misalignments that result in the clockwise (and counter-clockwise) order of states being altered as a result of wire permutation. For example, the clockwise order of the wires is reversed for the ACB, BAC and CBA configurations, which are represented as '1' permutation (circle 1308), the '2' permutation (circle 1304), and the '5' permutation (circle 1312). The table 1400 in FIG. 14 maps wire states of an un-permutated trio of wires to states occurring for different permutations of wire configuration. A simple swap of any pair of signals (for example: configurations BAC, ACB, CBA) will change the direction of rotation, but the Polarity bit 724 and the Flip bit 720 are unaffected.

Certain transmitters and receivers constructed according to certain aspects disclosed herein may invert the Rotation bit 722 of an FRP symbol 726 in order to correct wire misalignments in a 3-wire, 3-phase interface, including in a MIPI Alliance C-PHY high-speed mode interface for example. In one example, the Rotation bit 722 of an FRP symbol 726 may be inverted at an encoder of a transmitter adapted according to certain aspects disclosed herein. In another example, the Rotation bit 722 of an FRP symbol 726 may be inverted at a decoder of a receiver adapted according to certain aspects disclosed herein. In another example, the Rotation bit 722 of an FRP symbol 726 may be inverted at a demapper of a receiver adapted according to certain aspects disclosed herein. In another example, the Rotation bit 722 of an FRP symbol 726 may be inverted at a mapper of a transmitter adapted according to certain aspects disclosed herein.

Certain aspects associated with wire misalignments in a 3-wire, 3-phase interface and correction of such wire misalignments are applicable to an interface in which simplified 3-Phase encoding using integer encoding rates are employed. As illustrated in the state diagram 900 of FIG. 9 for example, each RP symbol 920 may correspond to an FRP symbol 726 of FIG. 7 with the Flip bit 720 set to a fixed value. In one example, the Flip bit 720 can be set to logic '0' for all available 2-bit symbols. In another example, the Flip bit 720 can be set to logic '1' for all available 2-bit symbols. Wire misalignments using this scheme can be corrected by inverting the Rotation bit 922 of an RP symbol 920 or inverting the Rotation bit 722 in an FRP symbol 726, in either the transmitter or receiver as disclosed herein.

Figure 15:
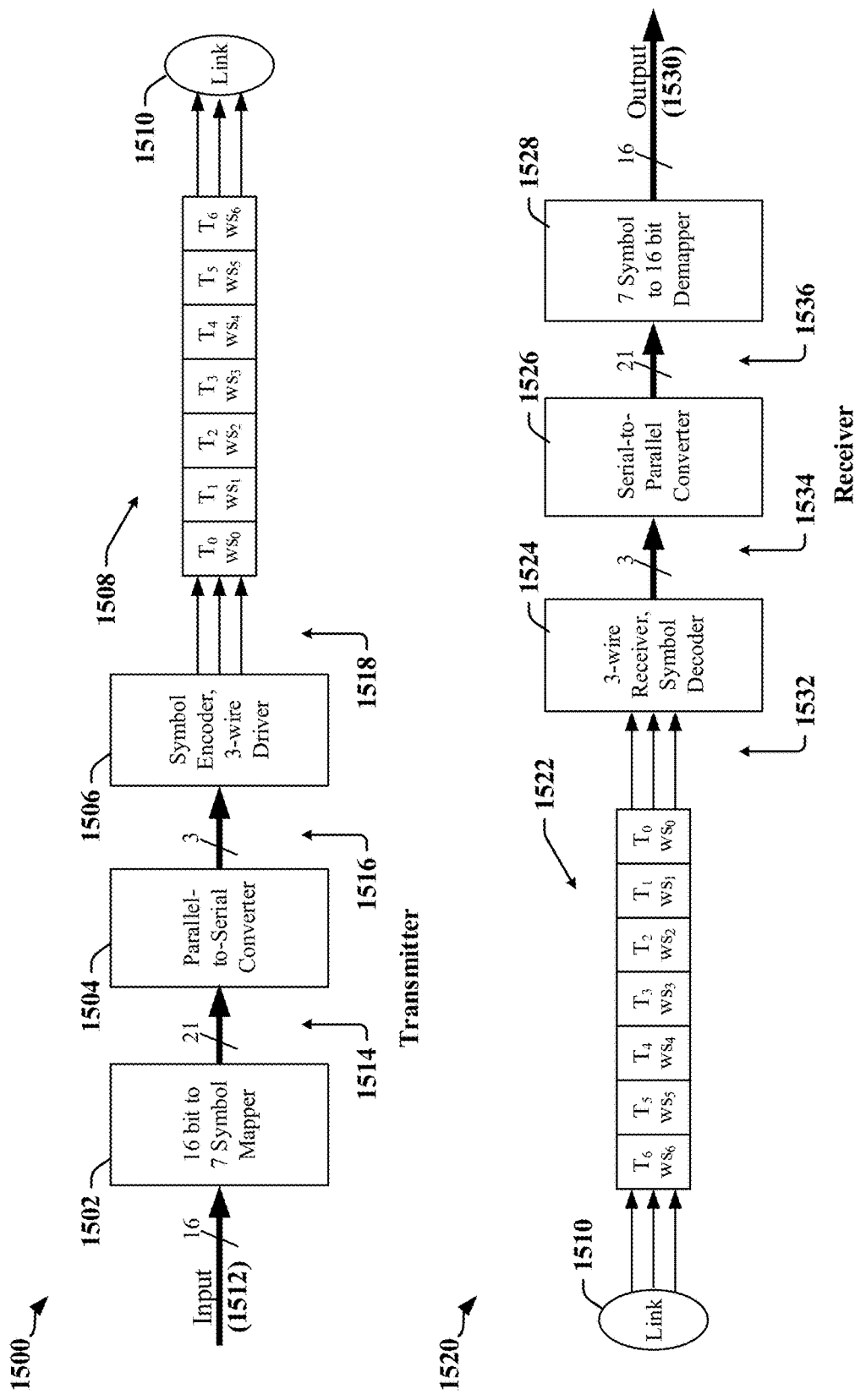
FIG. 15 illustrates a transmitter and a receiver in a 3-wire, 3-phase interface that may be adapted in accordance with certain aspects disclosed herein.

FIG. 15 illustrates a transmitter 1500 and a receiver 1520 configured for a 3-wire, 3-phase interface. A 16-bit data word is received as an input 1512 to a Mapper 1502 in the transmitter 1500. The Mapper 1502 maps the 16-bit data to a 21-bit word representative of 7 symbols. The 7 symbols are provided in a sequence of 3-bit symbols 1516 using a Parallel-To-Serial converter. Each symbol in the sequence of 3-bit symbols 1516 may be provided as, or used to provide an FRP symbol 726 input to a Symbol Encoder/Driver 1506 configured to produce a sequence of signaling states 1508 on 3-wire link 1510.

At the receiver 1520, a Receiver/Symbol Decoder 1524 decodes a sequence of FRP symbols 1522 received from the data link 1510. In wire-aligned or alignment-corrected operation, the Receiver/Symbol Decoder 1524 produces a sequence of FRP symbols 1522 that is provided to a Serial-to-Parallel Converter 1526, which in turn provides a 21-bit word to a Demapper 1528. The 16-bit output 1530 of the Demapper 1528 corresponds to the input 1512 of the transmitter 1500.

As noted herein, the sequence of FRP symbols 1522 received at the receiver 1520 may appear to be different from the sequence of 3-bit symbols 1516 transmitted by the transmitter 1500 due to wire misalignment.

Figure 16:
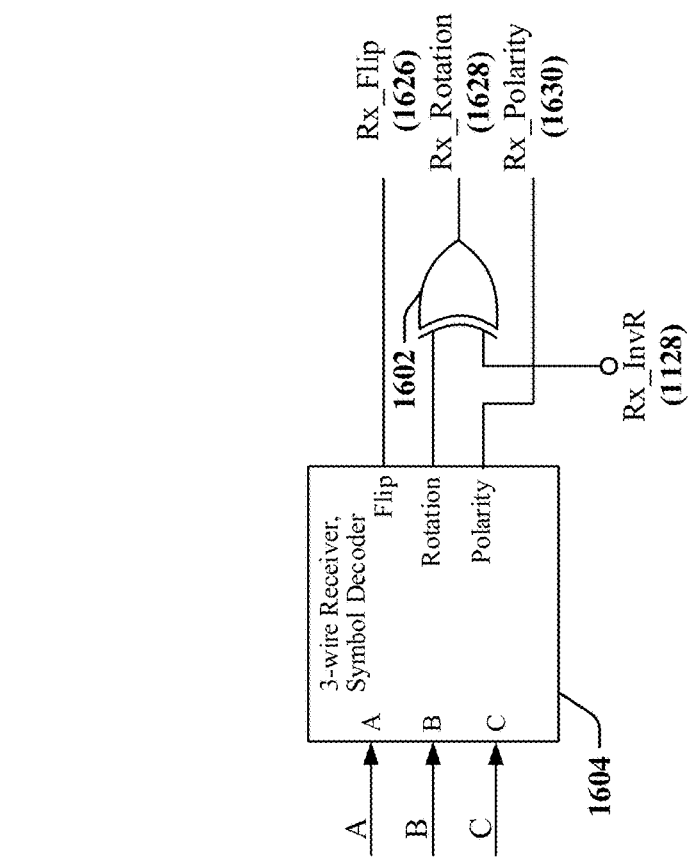
FIG. 16 is a block schematic diagram that illustrates a first example of logic that may be employed to correct wire misalignment according to certain aspects disclosed herein.

FIG. 16 is a block schematic diagram 1600 that illustrates a first example of logic that may be employed to correct wire misalignment. The logic of the first example may be used in a receiver. Inverting logic, such as an exclusive-OR gate 1602 may be controlled by an inversion control (Rx_InvR) signal 1128, which may be generated using logic configured in accordance with the table 1120 of FIG. 11. The Rx_InvR signal 1128 may be at a logic TRUE level when the clockwise order of the 3 wires is reversed (from the order ABC), and the TRUE logic level may cause the exclusive-OR gate 1602 to invert the Rotation bit output by the Receiver/Symbol Decoder 1604, thereby correcting for wiring misalignments.

Figure 17:
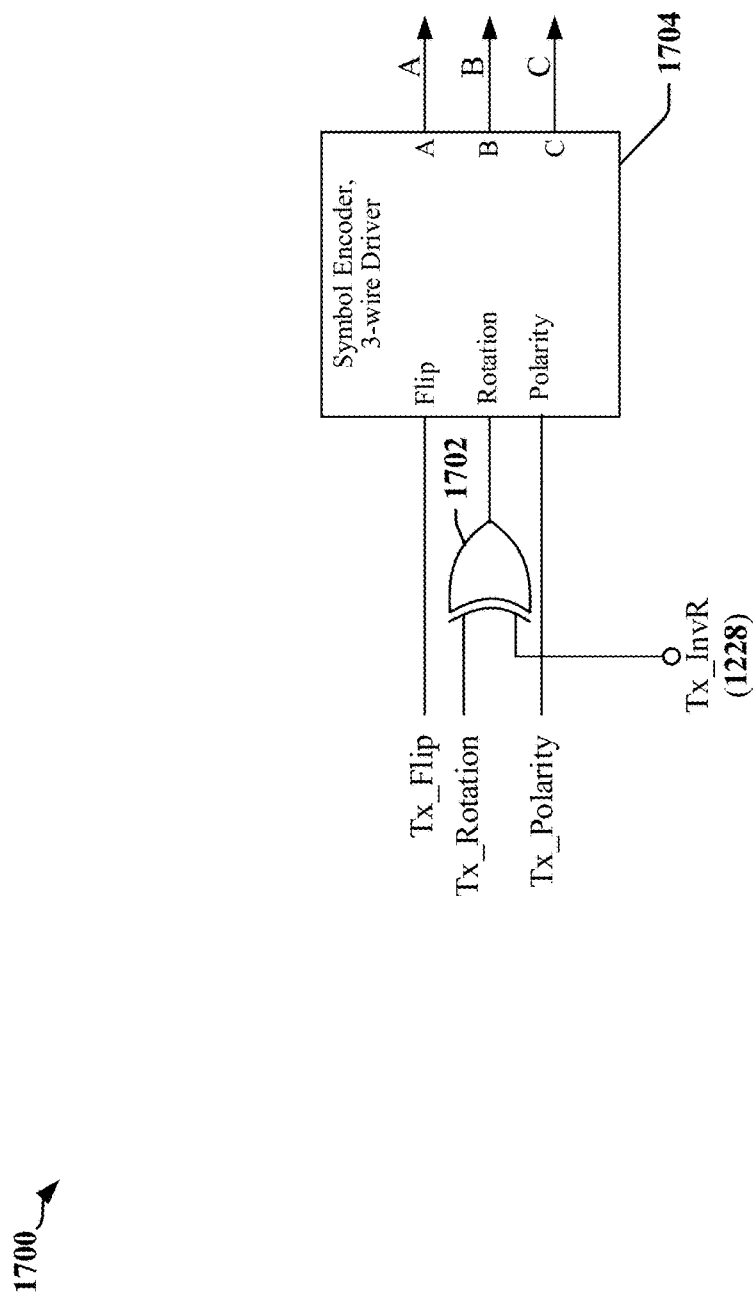
FIG. 17 is a block schematic diagram that illustrates a second example of logic that may be employed to correct wire misalignment according to certain aspects disclosed herein.

FIG. 17 is a block schematic diagram that illustrates a second example of logic that may be employed to correct wire misalignment. The logic of the second example may be used in a transmitter. Inverting logic, such as an exclusive-OR gate 1702 may be controlled by an inversion control (Tx_InvR) signal 1228, which may be generated using logic configured in accordance with the table 1220 of FIG. 12. The Tx_InvR signal 1228 may be at a logic TRUE level when the clockwise order of the 3 wires is reversed (from the order ABC), and the TRUE logic level may cause the exclusive-OR gate 1702 to invert the Rotation bit provided to the Receiver/Symbol Encoder 1704, thereby correcting for wiring misalignments.

In some instances, the inversion of Rotation bits is performed on the 21-bit bus 1514 deployed between the Mapper 1502 and Parallel-to-Serial Converter 1504 of the transmitter 1500 in FIG. 15, and/or on the 21-bit bus 1536 between the Serial-to-Parallel Converter 1526 and the Demapper 1528 of the receiver 1520. In these examples, an inverting exclusive-OR gate may be provided for each of the seven rotation bits in the 21-bit bus.

Figure 18:
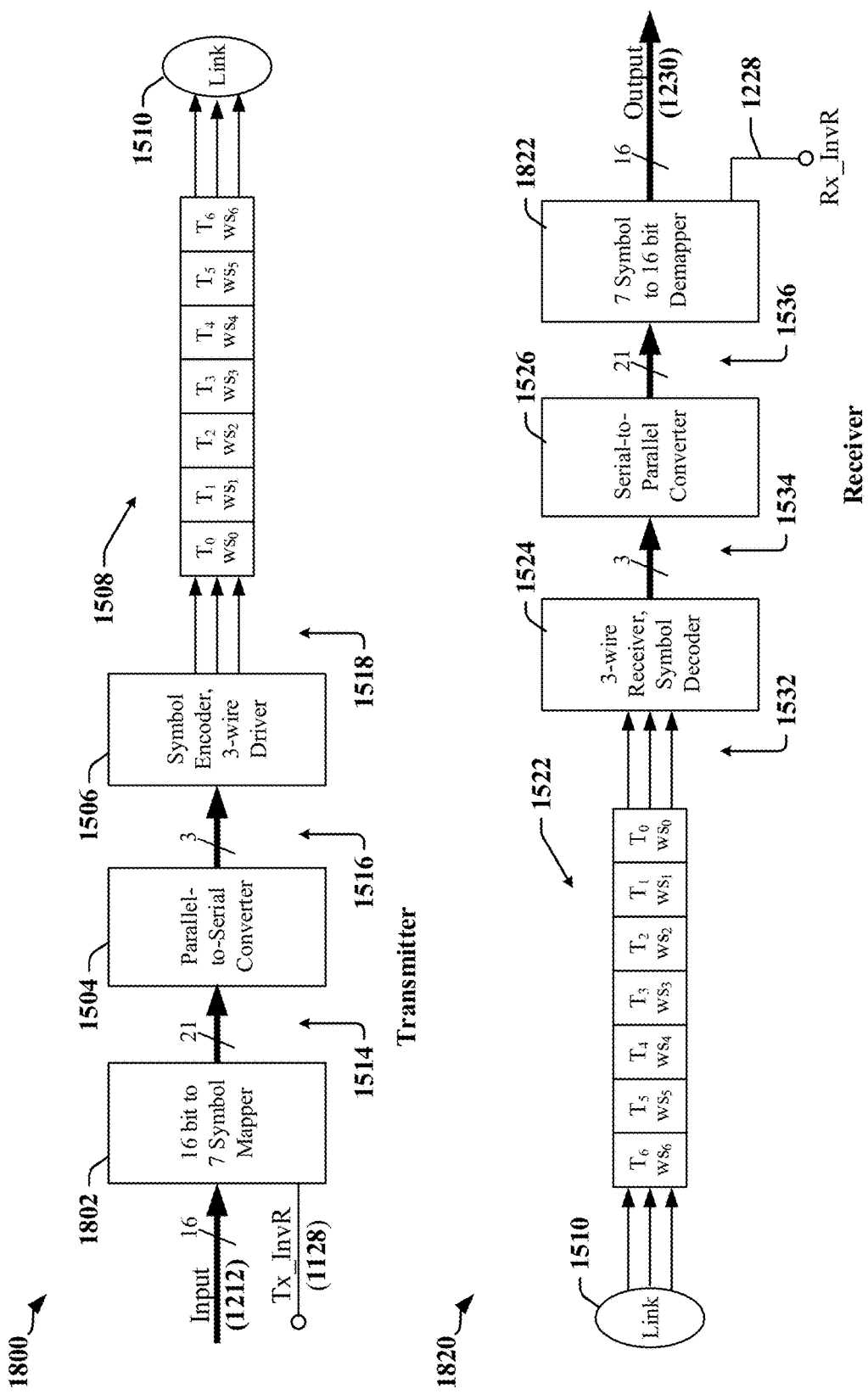
FIG. 18 is a block schematic diagram that illustrates a third example of logic that may be employed to correct wire misalignment according to certain aspects disclosed herein.

With reference also to FIG. 18, wiring misalignments may be corrected in a Mapper 1802 or Demapper 1822 adapted in accordance with certain aspects disclosed herein. In a transmitter 1800, the Mapper 1802 may be adapted to modify mapping criteria and/or one or more tables used in mapping data to a sequence of FRP symbols or RP Symbols. RP symbols may be treated as FRP symbols where the Flip bit is at a fixed logic state. The Mapper 1802 may respond to a TRUE logic level on the Tx_InvR signal 1528 by producing altered FRP symbols and/or RP symbols that are inconsistent with coding for an aligned 3-wire interface. The encoding of the altered FRP symbols and/or RP symbols may be affected by the misalignment of the 3-wire interface in a manner that produces proper decoding at the receiver 1820. In the receiver 1820, the Demapper 1822 may be adapted to modify mapping criteria and/or one or more tables used in demapping data from a sequence of FRP symbols. Accordingly, the Demapper 1822 may respond to a TRUE logic level on the Rx_InvR signal 728 by producing an output 1530 that corresponds to the input 1512 when FRP symbols and/or RP symbols have been altered in transmission over a misaligned 3-wire interface.

In some instances, a transmitter 1500, 1800 and/or receiver 1520, 1820 constructed according to certain aspects disclosed herein may be provided on a semiconductor IC device. In one example, an IC device may be mounted on a circuit board in the anticipation that the configuration of interconnects will remain fixed. In this example, the decision on whether to invert the Rotation bit will remain constant for that particular device. That is, the Rx_InvR signal 1128 and Tx_InvR signal 1228 settings remain constant. The Rx_InvR signal 1128 and Tx_InvR signal 1228, or internal flags and/or switches in the Mapper 1802, Symbol Encoder/Driver 1506, Demapper 1822 and/or Receiver/Symbol Decoder 1524 may indicate a wiring configuration or permutation that may be represented by a configuration parameter that is sent to the PHY. In one example, the configuration parameter may range between 0 and 5 (indicating the exact permutation), and the PHY may determine whether to invert the Rotation bit of the FRP symbol 726 (for example), in a manner consistent with the logic shown in the tables 1120, 1220 of FIGS. 11 and 12, respectively.

According to certain aspects, the configuration of the wires in the 3-wire link may be determined during startup or training of a 3-wire, 3-phase link. In some instances, symbols are transmitted over the 3-wire link to enable clock acquisition at the receiver and for other purposes. In some instances, a fixed sequence of symbols is transmitted that may be recognizable when the wiring is aligned and unrecognizable when wiring is unaligned. A receiver may alternate inversion status of the Rotation bit during synchronization until the synchronization sequence is recognized, and may thereby determine whether inversion is required during normal operation.

In some implementations, a 3-phase interface that has been adapted to accommodate wiring misalignments may be used to communicate two bit symbols, including symbols produced by the encoding schemes disclosed in relation to FIGS. 9 and 10. The principles of operation of an interface that can correct for wiring misalignments apply equally to these implementations. In many instances, a training sequence for a 3-bit symbol encoded interface may be used to determine wiring misalignments may also be used to determine wiring misalignments when the interface is configured to support 2-bit symbol encoding. In many instances, training and wiring misalignment may be performed at lower protocol layers, including the physical layer, which need not be aware of the number of bits used to encode information.

Example of a Preamble Usable for Determining Wiring Alignment

Figure 19:
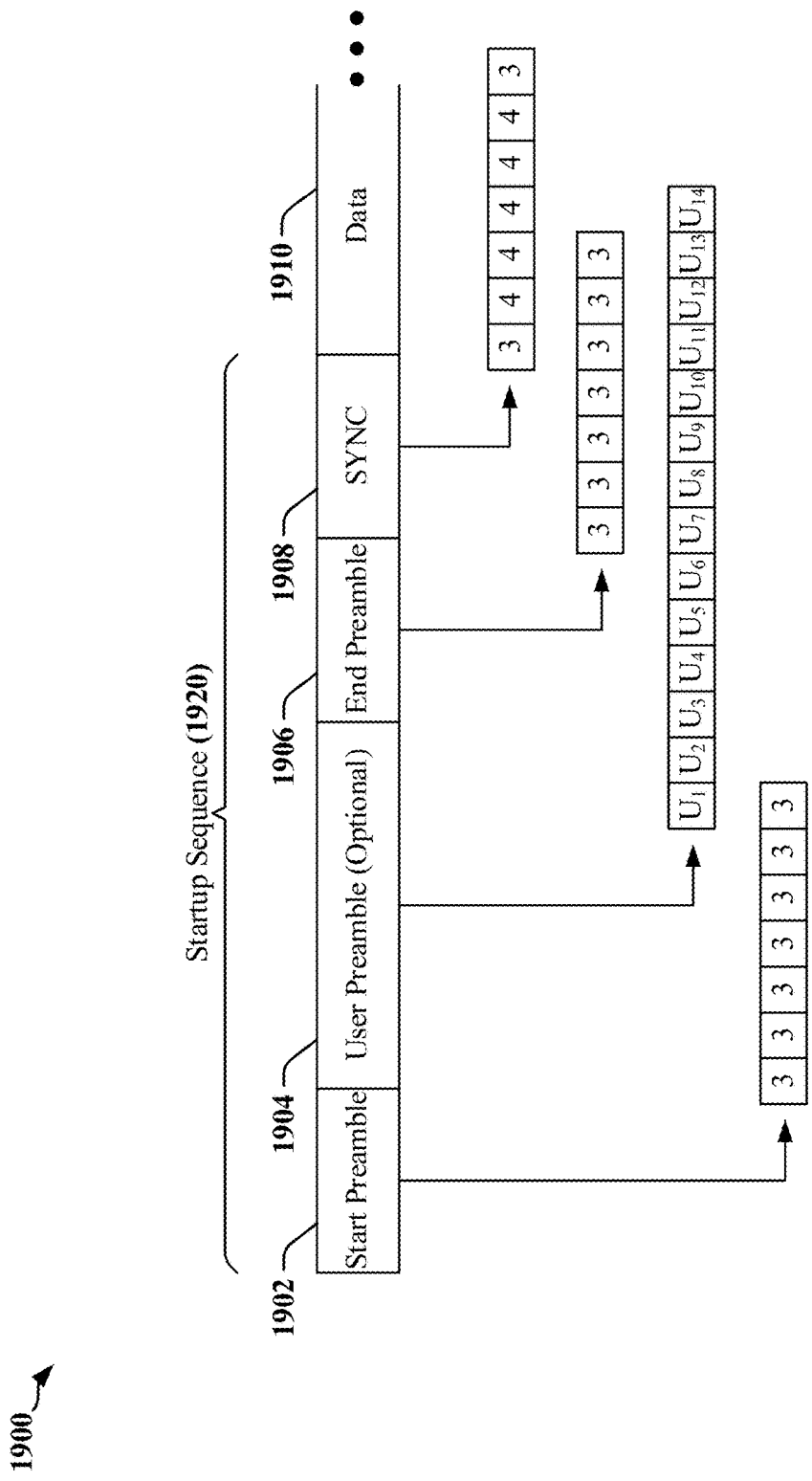
FIG. 19 illustrates an example of a startup sequence that may be used in accordance with certain aspects disclosed herein.

FIG. 19 is a diagram 1900 illustrating certain signaling that may be present in a C-PHY 3-phase interface. The signaling may include transmissions defined and/or used by interfaces that operate according to C-PHY standards. A startup sequence 1920 may be provided to enable a receiver to generate and synchronize its receive clock. The startup sequence 1920 may include a Start Preamble 1902, an optional User Preamble 1904, an End Preamble 1906, and a SYNC sequence 1908. After the startup sequence 1920, data 1910 may be transmitted in 7-symbol packets. For the purposes of this description, the component elements of the startup sequence 1920 are identified using the three-bit FRP symbol 726 illustrated in FIG. 7, which is used to select the signaling state of the 3-wire communication link for each symbol.

As illustrated, the Start Preamble 1902 includes 7 symbols that have an FRP value of 3. The number of symbols provided in the Start Preamble 1902 may be based on specifications governing operation of the 3-phase interface and/or may be selected according to application needs. In one example, the Start Preamble 1902, which may also be referred to as the "PreBegin," may have a number of symbols that can range between 7 symbols and 448 symbols. The User Preamble 1904, when transmitted, includes 14 user-defined symbols, and the End Preamble 1906 includes 7 symbols that have an FRP value of 3. A SYNC sequence 1908 having a unique combination of 7 symbols which, for example, may begin and end with symbols that have an FRP value of 3, with the remaining 5 symbols having an FRP value of 4.

In some instances, the device may be adapted or configured to determine presence or absence of a misalignment of the 3-wire communication link when data is encoded in FRP symbols 726 (see FIG. 7) or RP symbols 920 (see FIG. 9).

The device may determine presence or absence of misalignments using the Start preamble 1902 where each of the at least 7 symbols in the Start preamble 1902 has an FRP/RP value of 3 (no flip, positive (clockwise) rotation, and invert polarity). When a wire misalignment occurs such that the wires are permuted in a sequence that inverted the rotation then the preamble would be received as a sequence of symbols that each have an FRP/RP value of 1. An auto-detection circuit provided in the receiver may then monitor the Start Preamble 1902 at the beginning of each high-speed burst. In some instances, the configuration of wires in the 3-wire communication link may be assessed during the first high-speed burst and/or during the next high-speed burst occurring after an error has been detected in a high-speed transmission. In some instances, other fields of the Startup Sequence 1920 may be used to determine or confirm the configuration of wires in the 3-wire communication link. The configuration of wires in the 3-wire communication link, once determined, may be used to configure low-power mode drivers and receivers.

In some examples, the device may receive the 3-phase signal from the 3-wire communication link. The first bit of the 3-bit symbol may indicate direction of phase rotation between states of the 3-phase signal at the transition of signaling state of the 3-wire communication link.

In some examples, the device may transmit the 3-phase signal over the 3-wire communication link. The first bit of the 3-bit symbol may control direction of phase rotation between states of the 3-phase signal at the transition of signaling state of the 3-wire communication link.

In some examples, the device may select a table used by a mapper based on whether a misalignment of the 3-wire communication link is determined to be present. The 3-bit symbol may be one of a sequence of symbols generated by the mapper. The sequence of symbols may encode data to be transmitted over the 3-wire communication link. The first bit in each symbol of the sequence of symbols may be inverted in a first table that is selected when the misalignment of the 3-wire communication link is determined to affect phase relationships between the two or more signals. The first bit in each symbol of the sequence of symbols may not be inverted in a second table that is selected when the misalignment of the 3-wire communication link is determined not to affect phase relationships between the two or more signals.

In some examples, the device may select a table used by a demapper to decode data from a sequence of symbols received from the 3-wire communication link. The table is selected from a plurality of tables based on whether a misalignment of the 3-wire communication link is determined to be present.

In some examples, the device may determine the presence of the misalignment of the 3-wire communication link by receiving one or more sequences of symbols from the 3-wire communication link during a synchronization period, and determining that the 3-wire communication link is properly aligned when one or more synchronization words are successfully decoded without inverting a rotation bit output by a demapper circuit.

In some examples, the device may determine the presence of the misalignment of the 3-wire communication link by inverting the first bit in each symbol of a sequence of symbols received from the 3-wire communication link during synchronization of the 3-wire communication link, determining that the 3-wire communication link is misaligned when synchronization information is decoded from sequence of symbols while the first bit in the each symbol is inverted.

In some examples, the presence of the misalignment of the 3-wire communication link is determined from configuration information maintained by the device. In some examples, the 3-wire communication link may be operated according to MIPI Alliance C-PHY 3-phase signaling standards.

Examples of Processing Circuits and Methods

Figure 20:
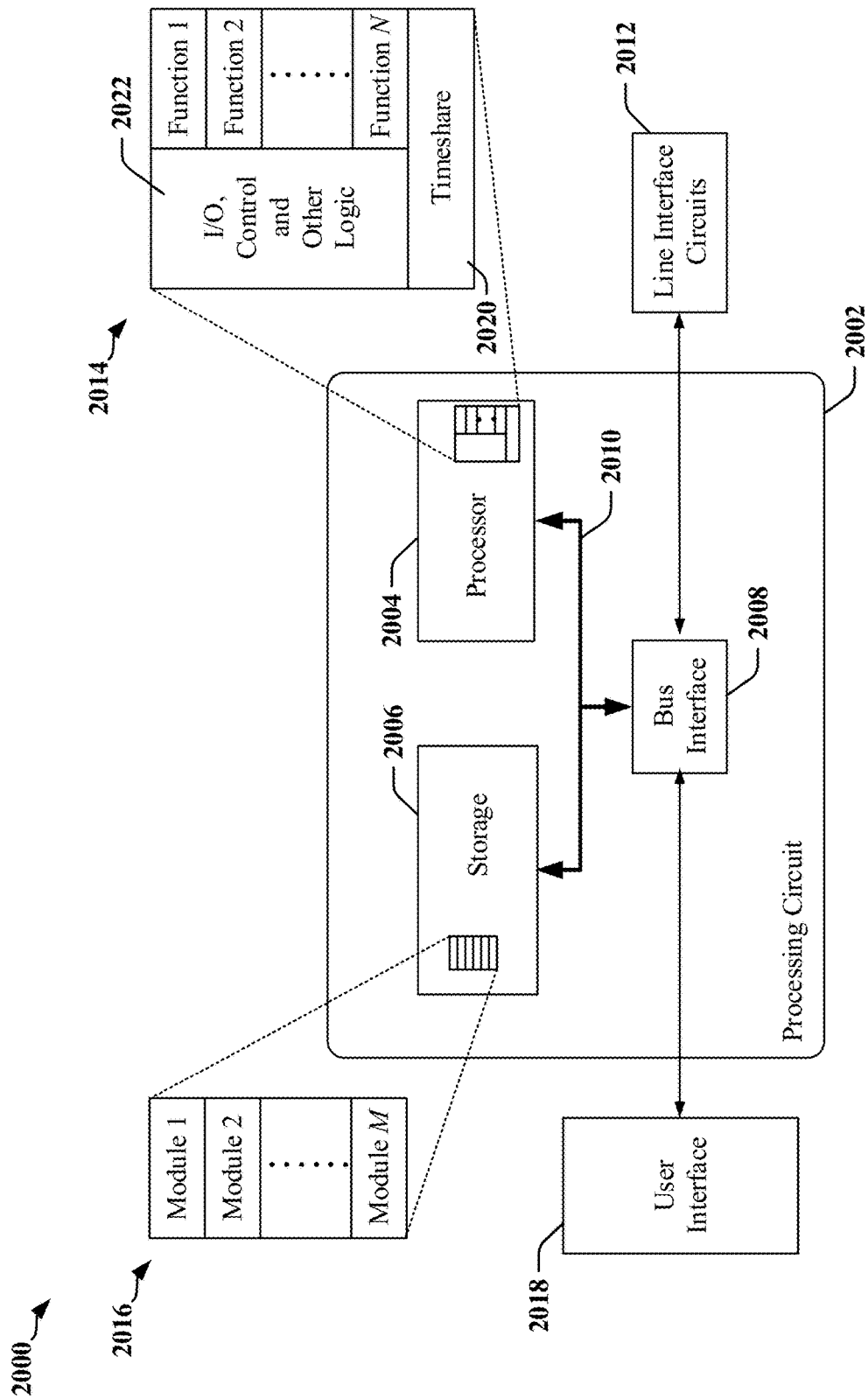
FIG. 20 illustrates an example of an apparatus employing a processing circuit that may be adapted according to certain aspects disclosed herein.

FIG. 20 is a conceptual diagram 2000 illustrating a simplified example of a hardware implementation for an apparatus employing a processing circuit 2002 that may be configured to perform one or more functions disclosed herein. In accordance with various aspects of the disclosure, an element, or any portion of an element, or any combination of elements as disclosed herein may be implemented using the processing circuit 2002. The processing circuit 2002 may include one or more processors 2004 that are controlled by some combination of hardware and software modules. Examples of processors 2004 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2004 may include specialized processors that perform specific functions, and that may be configured, augmented or controlled by one of the software modules 2016. The one or more processors 2004 may be configured through a combination of software modules 2016 loaded during initialization, and further configured by loading or unloading one or more software modules 2016 during operation.

In the illustrated example, the processing circuit 2002 may be implemented with a bus architecture, represented generally by the bus 2010. The bus 2010 may include any number of interconnecting buses and bridges depending on the specific application of the processing circuit 2002 and the overall design constraints. The bus 2010 links together various circuits including the one or more processors 2004, and storage 2006. Storage 2006 may include memory devices and mass storage devices, and may be referred to herein as computer-readable media and/or processor-readable media. The bus 2010 may also link various other circuits such as timing sources, timers, peripherals, voltage regulators, and power management circuits. A bus interface 2008 may provide an interface between the bus 2010 and one or more line interface circuits 2012. A line interface circuit 2012 may be provided for each networking technology supported by the processing circuit. In some instances, multiple networking technologies may share some or all of the circuitry or processing modules found in a line interface circuit 2012. Each line interface circuit 2012 provides a means for communicating with various other apparatus over a transmission medium. Depending upon the nature of the apparatus, a user interface 2018 (e.g., keypad, display, speaker, microphone, joystick) may also be provided, and may be communicatively coupled to the bus 2010 directly or through the bus interface 2008.

A processor 2004 may be responsible for managing the bus 2010 and for general processing that may include the execution of software stored in a computer-readable medium that may include the storage 2006. In this respect, the processing circuit 2002, including the processor 2004, may be used to implement any of the methods, functions and techniques disclosed herein. The storage 2006 may be used for storing data that is manipulated by the processor 2004 when executing software, and the software may be configured to implement any one of the methods disclosed herein.

One or more processors 2004 in the processing circuit 2002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2006 or in an external computer readable medium. The external computer-readable medium and/or storage 2006 may include a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a "flash drive," a card, a stick, or a key drive), a RAM, a ROM, a programmable ROM (PROM), an erasable PROM (EPROM), an EEPROM, a register, a removable disk, and any other suitable medium for storing software and/or instructions that may be accessed and read by a computer. The computer-readable medium and/or storage 2006 may also include, by way of example, a carrier wave, a transmission line, and any other suitable medium for transmitting software and/or instructions that may be accessed and read by a computer. Computer-readable medium and/or the storage 2006 may reside in the processing circuit 2002, in the processor 2004, external to the processing circuit 2002, or be distributed across multiple entities including the processing circuit 2002. The computer-readable medium and/or storage 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2006 may maintain software maintained and/or organized in loadable code segments, modules, applications, programs, etc., which may be referred to herein as software modules 2016. Each of the software modules 2016 may include instructions and data that, when installed or loaded on the processing circuit 2002 and executed by the one or more processors 2004, contribute to a run-time image 2014 that controls the operation of the one or more processors 2004. When executed, certain instructions may cause the processing circuit 2002 to perform functions in accordance with certain methods, algorithms and processes described herein.

Some of the software modules 2016 may be loaded during initialization of the processing circuit 2002, and these software modules 2016 may configure the processing circuit 2002 to enable performance of the various functions disclosed herein. For example, some software modules 2016 may configure internal devices and/or logic circuits 2022 of the processor 2004, and may manage access to external devices such as the line interface circuits 2012, the bus interface 2008, the user interface 2018, timers, mathematical coprocessors, and so on. The software modules 2016 may include a control program and/or an operating system that interacts with interrupt handlers and device drivers, and that controls access to various resources provided by the processing circuit 2002. The resources may include memory, processing time, access to the line interface circuits 2012, the user interface 2018, and so on.

One or more processors 2004 of the processing circuit 2002 may be multifunctional, whereby some of the software modules 2016 are loaded and configured to perform different functions or different instances of the same function. The one or more processors 2004 may additionally be adapted to manage background tasks initiated in response to inputs from the user interface 2018, the line interface circuits 2012, and device drivers, for example. To support the performance of multiple functions, the one or more processors 2004 may be configured to provide a multitasking environment, whereby each of a plurality of functions is implemented as a set of tasks serviced by the one or more processors 2004 as needed or desired. In one example, the multitasking environment may be implemented using a timesharing program 2020 that passes control of a processor 2004 between different tasks, whereby each task returns control of the one or more processors 2004 to the timesharing program 2020 upon completion of any outstanding operations and/or in response to an input such as an interrupt. When a task has control of the one or more processors 2004, the processing circuit is effectively specialized for the purposes addressed by the function associated with the controlling task. The timesharing program 2020 may include an operating system, a main loop that transfers control on a round-robin basis, a function that allocates control of the one or more processors 2004 in accordance with a prioritization of the functions, and/or an interrupt driven main loop that responds to external events by providing control of the one or more processors 2004 to a handling function.

In one example, the processing circuit 2002 may be provided in an apparatus that includes a communications interface coupled to the line interface circuits 2012 and configured to communicate data using a 3-phase signal transmitted in different phases on all three wires of a 3-wire communication link, and correction logic configured to correct phase relationships between two or more signals carried on the 3-wire communication link. The processing circuit 2002 may be configured to determine presence of a misalignment of the 3-wire communication link, and cause the correction logic to invert a first bit of a 3-bit symbol corresponding to a transition of signaling state of the 3-wire interface when a misalignment of the 3-wire communication link involving two or more wires is determined to affect the phase relationships between two or more signals carried on the 3-wire interface.

The processing circuit 2002 may be configured to select a table used to map data values to sequences of symbols based on whether a misalignment of the 3-wire communication link is determined to be present. Each symbol may be a 3-bit symbol, in which the first bit is inverted in a first table that is selected when the misalignment of the 3-wire communication link is determined to affect phase relationships between the two or more signals. The first bit in each symbol of the sequence of symbols is not inverted in a second table that is selected when the misalignment of the 3-wire communication link is determined not to affect phase relationships between the two or more signals.

The processing circuit 2002 may be configured to determine the presence of the misalignment of the 3-wire communication link by toggling the first bit in each symbol of a sequence of symbols transmitted on the 3-wire communication link during synchronization of the 3-wire communication link until synchronization information is decoded from sequence of symbols. The storage 2006 may maintain configuration information that indicates whether of the misalignment of the 3-wire communication link is present.

Figure 21:
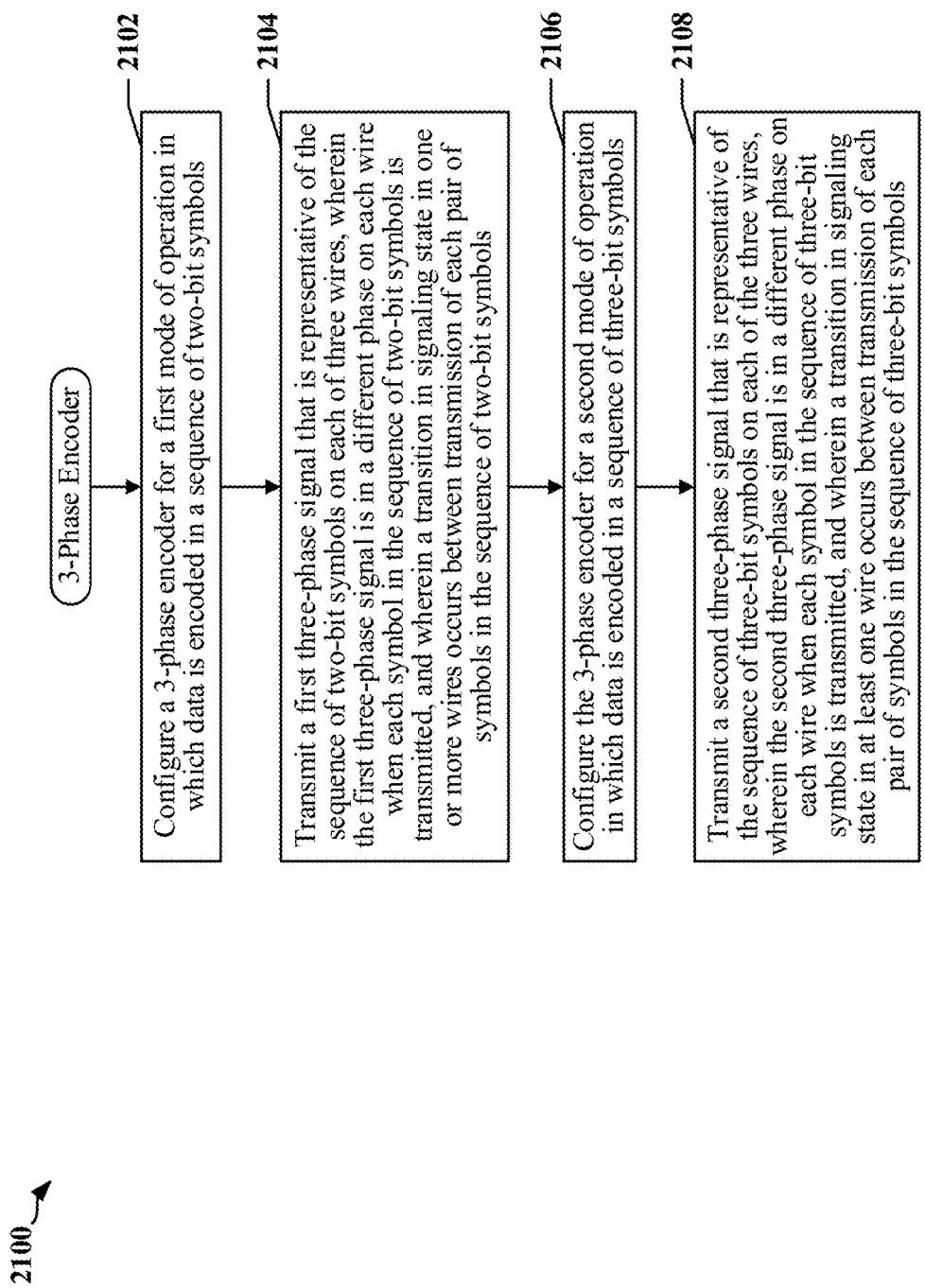
FIG. 21 is a flow chart of a method of wireless communication.

FIG. 21 is a flow chart 2100 of a method of wireless communication. The method may be performed by a device configured for communicating using a 3-phase signal transmitted over a 3-wire communication link. In one example, the device may include or cooperate with a processing circuit 2002.

At block 2102, the device may configure a 3-phase encoder for a first mode of operation in which data is encoded in a sequence of two-bit symbols. At block 2104, the device may transmit a first three-phase signal that is representative of the sequence of two-bit symbols on each of three wires. The first three-phase signal is in a different phase on each wire when each symbol in the sequence of two-bit symbols is transmitted. A transition in signaling state in one or more wires occurs between transmission of each pair of symbols in the sequence of two-bit symbols. At block 2106, the device may configure the 3-phase encoder for a second mode of operation in which data is encoded in a sequence of three-bit symbols.

At block 2108, the device may transmit a second three-phase signal that is representative of the sequence of three-bit symbols on each of the three wires. The second three-phase signal is in a different phase on each wire when each symbol in the sequence of three-bit symbols is transmitted. A transition in signaling state in at least one wire occurs between transmission of each pair of symbols in the sequence of three-bit symbols.

In various examples, the signaling state of the three wires is defined by polarity and direction of rotation when the 3-phase encoder is configured for the first mode of operation. In one example, each symbol in the sequence of two-bit symbols selects between four transitions that are available from each signaling state when the 3-phase encoder is configured for the first mode of operation. Each symbol in the sequence of two-bit symbols may have a first bit that determines whether a next signaling state has a different polarity than a current signaling state, and a second bit defines phase rotation associated with the next signaling state. In another example, each symbol in the sequence of three-bit symbols selects between five transitions that are available from each signaling state when the 3-phase encoder is configured for the second mode of operation. Each symbol in the sequence of three-bit symbols may have a first bit that determines whether a next signaling state has a different polarity than a current signaling state, a second bit defines phase rotation associated with the next signaling state, and a third bit that determines whether the next signaling state involves only a polarity switch from the current signaling state.

In some implementations, the device may determine presence of a misalignment of the three wires involving two or more wires, invert a phase rotation bit of each symbol in the sequence of two-bit symbols when the misalignment of the three wires is determined to affect phase relationships between signals carried on the three wires when the 3-phase encoder is configured for the first mode of operation, and invert a phase rotation bit of each symbol in the sequence of three-bit symbols when the misalignment of the three wires is determined to affect phase relationships between signals carried on the three wires when the 3-phase encoder is configured for the second mode of operation. In one example, the presence of the misalignment of the three wires is determined during a training transmission.

Figure 22:
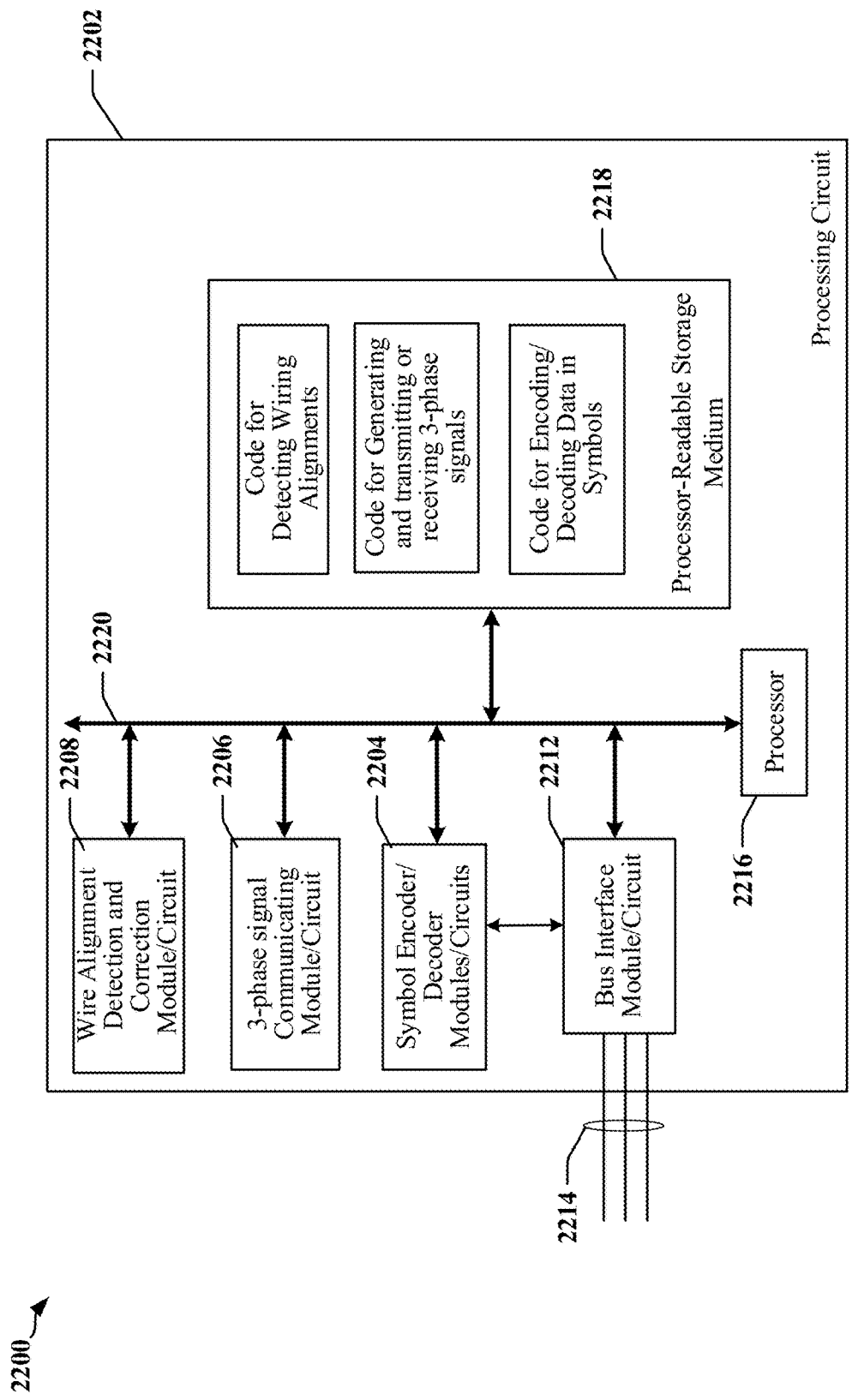
FIG. 22 illustrates an example of a hardware implementation for an apparatus employing a processing employing a processing circuit adapted according to certain aspects disclosed herein.

FIG. 22 is a diagram illustrating a simplified example of a hardware implementation for an apparatus 2200 employing a processing circuit 2202. The processing circuit 2202 may be implemented with a bus architecture, represented generally by the bus 2220. The bus 2220 may include any number of interconnecting buses and bridges depending on the specific application of the processing circuit 2202 and the overall design constraints. The bus 2220 links together various circuits including one or more processors and/or hardware modules, represented by the processor 2216, the modules or circuits 2204, 2206 and 2208, a plurality of different encoders, a bus interface module or circuit 2212 that includes line drivers configurable to drive connectors or wires of a communication link 2214 and the computer-readable storage medium 2218. The bus 2220 may also link various other circuits such as timing sources, peripherals, voltage regulators, and power management circuits, which are well known in the art, and therefore, will not be described any further.

The processor 2216 is responsible for general processing, including the execution of software stored on the computer-readable storage medium 2218. The software, when executed by the processor 2216, causes the processing circuit 2202 to perform the various functions described supra for any particular apparatus. The computer-readable storage medium 2218 may also be used for storing data that is manipulated by the processor 2216 when executing software. The processing circuit 2202 further includes at least one of the modules or circuits 2204, 2206 and 2208. The modules may be software modules running in the processor 2216, resident/stored in the computer-readable storage medium 2218, one or more hardware modules coupled to the processor 2216, or some combination thereof.

In one configuration, the apparatus 2200 for wireless communication includes modules or circuits 2204 for determining presence of a misalignment of the 3-wire interface involving two or more wires, and modules or circuits 2204, 2206 for inverting a first bit of a 3-bit symbol encoded in a transition of signaling state of the 3-wire bus when the misalignment of the 3-wire interface is determined to affect phase relationships between two or more signals carried on the three wires.

In one example, the apparatus 2200 may be a data communication apparatus that includes modules or circuits 2204, 2206, 2212 for transmitting a 3-phase signal on each of the three wires of the 3-wire communication link 2214 in different phases, including an encoder that encodes data in transitions of signaling state of the three wires of the communication link 2214. The apparatus 2200 may include modules or circuits 2208 for determining presence of a misalignment of the 3-wire interface involving two or more wires of the communication link 2214. The apparatus 2200 may include modules or circuits 2208 for correcting phase relationships between two or more signals carried on the three wires, including logic configured to invert a first bit of a 3-bit symbol corresponding to a transition of signaling state of the 3-wire communication link 2214 when the misalignment of the 3-wire communication link 2214 is determined to affect the phase relationships between the two or more signals.

The processing circuit 2202 may be configured to configure a 3-phase encoder for a first mode of operation in which data is encoded in a sequence of two-bit symbols, transmit a first three-phase signal that is representative of the sequence of two-bit symbols on each of the three wires. The first three-phase signal is in a different phase on each wire when each symbol in the sequence of two-bit symbols is transmitted, and a transition in signaling state in one or more wires occurs between transmission of each pair of symbols in the sequence of two-bit symbols. The processing circuit 2202 may configure the 3-phase encoder for a second mode of operation in which data is encoded in a sequence of three-bit symbols, and transmit a second three-phase signal that is representative of the sequence of three-bit symbols on each of the three wires. The second three-phase signal is in a different phase on each wire when each symbol in the sequence of three-bit symbols is transmitted, and a transition in signaling state in at least one wire occurs between transmission of each pair of symbols in the sequence of three-bit symbols.

Signaling state of the three wires may be defined by polarity and direction of rotation when the 3-phase encoder is configured for the first mode of operation. Each symbol in the sequence of two-bit symbols selects between four transitions that are available from each signaling state when the 3-phase encoder is configured for the first mode of operation. Each symbol in the sequence of two-bit symbols may have a first bit that determines whether a next signaling state has a different polarity than a current signaling state, and a second bit defines phase rotation associated with the next signaling state. Each symbol in the sequence of three-bit symbols selects between five transitions that are available from each signaling state when the 3-phase encoder is configured for the second mode of operation. Each symbol in the sequence of three-bit symbols may have a first bit that determines whether a next signaling state has a different polarity than a current signaling state, a second bit defines phase rotation associated with the next signaling state, and a third bit that determines whether the next signaling state involves only a polarity switch from the current signaling state.

The processing circuit 2202 may be further configured to determine presence of a misalignment of the three wires involving two or more wires, invert a phase rotation bit of each symbol in the sequence of two-bit symbols when the misalignment of the three wires is determined to affect phase relationships between signals carried on the three wires when the 3-phase encoder is configured for the first mode of operation, and invert a phase rotation bit of each symbol in the sequence of three-bit symbols when the misalignment of the three wires is determined to affect phase relationships between signals carried on the three wires when the 3-phase encoder is configured for the second mode of operation. The presence of the misalignment of the three wires is determined during a training transmission.

The computer-readable storage medium 2218 may have one or more instructions which, when executed by at least one processor 2216 of the processing circuit 2202, may cause the processing circuit 2202 to configure a 3-phase encoder for a first mode of operation in which data is encoded in a sequence of two-bit symbols, transmit a first three-phase signal that is representative of the sequence of two-bit symbols on each of three wires, where the first three-phase signal is in a different phase on each wire when each symbol in the sequence of two-bit symbols is transmitted, and where a transition in signaling state in one or more wires occurs between transmission of each pair of symbols in the sequence of two-bit symbols. The one or more instructions may cause the processing circuit 2202 to configure the 3-phase encoder for a second mode of operation in which data is encoded in a sequence of three-bit symbols, and transmit a second three-phase signal that is representative of the sequence of three-bit symbols on each of the three wires, where the second three-phase signal is in a different phase on each wire when each symbol in the sequence of three-bit symbols is transmitted, and where a transition in signaling state in at least one wire occurs between transmission of each pair of symbols in the sequence of three-bit symbols.

Signaling state of the three wires is defined by polarity and direction of rotation when the 3-phase encoder is configured for the first mode of operation. Each symbol in the sequence of two-bit symbols selects between four transitions that are available from each signaling state when the 3-phase encoder is configured for the first mode of operation. Each symbol in the sequence of two-bit symbols has a first bit that determines whether a next signaling state has a different polarity than a current signaling state, and a second bit defines phase rotation associated with the next signaling state.

Each symbol in the sequence of three-bit symbols selects between five transitions that are available from each signaling state when the 3-phase encoder is configured for the second mode of operation. Each symbol in the sequence of three-bit symbols has a first bit that determines whether a next signaling state has a different polarity than a current signaling state, a second bit defines phase rotation associated with the next signaling state, and a third bit that determines whether the next signaling state involves only a polarity switch from the current signaling state.

The one or more instructions may cause the processing circuit 2202 to determine presence of a misalignment of the three wires involving two or more wires, invert a phase rotation bit of each symbol in the sequence of two-bit symbols when the misalignment of the three wires is determined to affect phase relationships between signals carried on the three wires when the 3-phase encoder is configured for the first mode of operation, and invert a phase rotation bit of each symbol in the sequence of three-bit symbols when the misalignment of the three wires is determined to affect phase relationships between signals carried on the three wires when the 3-phase encoder is configured for the second mode of operation. The presence of the misalignment of the three wires may be determined during a training transmission.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for data communication, comprising:
   configuring a 3-phase encoder for a first mode of operation in which data is encoded in a sequence of two-bit symbols;
   transmitting a first three-phase signal that is representative of the sequence of two-bit symbols on each of three wires, wherein the first three-phase signal is in a different phase on each wire when each symbol in the sequence of two-bit symbols is transmitted, and wherein a transition in signaling state in one or more wires occurs between transmission of each pair of symbols in the sequence of two-bit symbols;
   configuring the 3-phase encoder for a second mode of operation in which data is encoded in a sequence of three-bit symbols; and
   transmitting a second three-phase signal that is representative of the sequence of three-bit symbols on each of the three wires, wherein the second three-phase signal is in a different phase on each wire when each symbol in the sequence of three-bit symbols is transmitted, and wherein a transition in signaling state in at least one wire occurs between transmission of each pair of symbols in the sequence of three-bit symbols.

2. The method of claim 1, wherein signaling states of the three wires are defined by polarity and direction of rotation when the 3-phase encoder is configured for the first mode of operation.

3. The method of claim 2, wherein each symbol in the sequence of two-bit symbols selects between four transitions that are available from each signaling state of the three wires when the 3-phase encoder is configured for the first mode of operation.

4. The method of claim 2, wherein each symbol in the sequence of two-bit symbols comprises a first bit that determines whether a next signaling state has a different polarity than a current signaling state, and a second bit that defines phase rotation associated with the next signaling state.

5. The method of claim 2, wherein each symbol in the sequence of three-bit symbols selects between five transitions that are available from each signaling state when the 3-phase encoder is configured for the second mode of operation.

6. The method of claim 5, wherein each symbol in the sequence of three-bit symbols comprises a first bit that determines whether a next signaling state has a different polarity than a current signaling state, a second bit that defines phase rotation associated with the next signaling state, and a third bit that determines whether the next signaling state involves only a polarity switch from the current signaling state.

7. The method of claim 1, further comprising:
   determining presence of a misalignment of the three wires involving two or more wires;
   inverting a phase rotation bit of each symbol in the sequence of two-bit symbols when the misalignment of the three wires is determined to affect phase relationships between signals carried on the three wires when the 3-phase encoder is configured for the first mode of operation; and
   inverting a phase rotation bit of each symbol in the sequence of three-bit symbols when the misalignment of the three wires is determined to affect phase relationships between signals carried on the three wires when the 3-phase encoder is configured for the second mode of operation.

8. The method of claim 7, wherein the presence of the misalignment of the three wires is determined during a training transmission.

9. A data communication apparatus, comprising:
a bus interface configured to couple the apparatus to three wires of a communication link;
a 3-phase encoder adapted to provide sequences of symbols used to configure three-phase signals transmitted over the three wires; and
a processing circuit configured to:
configure the 3-phase encoder for a first mode of operation in which data is encoded in a sequence of two-bit symbols;
transmit a first three-phase signal that is representative of the sequence of two-bit symbols on each of the three wires, wherein the first three-phase signal is in a different phase on each wire when each symbol in the sequence of two-bit symbols is transmitted, and wherein a transition in signaling state in one or more wires occurs between transmission of each pair of symbols in the sequence of two-bit symbols;
configure the 3-phase encoder for a second mode of operation in which data is encoded in a sequence of three-bit symbols; and
transmit a second three-phase signal that is representative of the sequence of three-bit symbols on each of the three wires, wherein the second three-phase signal is in a different phase on each wire when each symbol in the sequence of three-bit symbols is transmitted, and wherein a transition in signaling state in at least one wire occurs between transmission of each pair of symbols in the sequence of three-bit symbols.

10. The apparatus of claim 9, wherein signaling states of the three wires are defined by polarity and direction of rotation when the 3-phase encoder is configured for the first mode of operation.

11. The apparatus of claim 10, wherein each symbol in the sequence of two-bit symbols selects between four transitions that are available from each signaling state when the 3-phase encoder is configured for the first mode of operation.

12. The apparatus of claim 10, wherein each symbol in the sequence of two-bit symbols comprises a first bit that determines whether a next signaling state has a different polarity than a current signaling state, and a second bit that defines phase rotation associated with the next signaling state.

13. The apparatus of claim 10, wherein each symbol in the sequence of three-bit symbols selects between five transitions that are available from each signaling state when the 3-phase encoder is configured for the second mode of operation.

14. The apparatus of claim 13, wherein each symbol in the sequence of three-bit symbols comprises a first bit that determines whether a next signaling state has a different polarity than a current signaling state, a second bit that defines phase rotation associated with the next signaling state, and a third bit that determines whether the next signaling state involves only a polarity switch from the current signaling state.

15. The apparatus of claim 9, wherein the processing circuit is further configured to:
determine presence of a misalignment of the three wires involving two or more wires;
invert a phase rotation bit of each symbol in the sequence of two-bit symbols when the misalignment of the three wires is determined to affect phase relationships between signals carried on the three wires when the 3-phase encoder is configured for the first mode of operation; and
invert a phase rotation bit of each symbol in the sequence of three-bit symbols when the misalignment of the three wires is determined to affect phase relationships between signals carried on the three wires when the 3-phase encoder is configured for the second mode of operation.

16. The apparatus of claim 15, wherein the presence of the misalignment of the three wires is determined during a training transmission.

17. A processor-readable storage medium having one or more instructions which, when executed by at least one processor of a processing circuit, cause the processing circuit to:
configure a 3-phase encoder for a first mode of operation in which data is encoded in a sequence of two-bit symbols;
transmit a first three-phase signal that is representative of the sequence of two-bit symbols on each of three wires, wherein the first three-phase signal is in a different phase on each wire when each symbol in the sequence of two-bit symbols is transmitted, and wherein a transition in signaling state in one or more wires occurs between transmission of each pair of symbols in the sequence of two-bit symbols;
configure the 3-phase encoder for a second mode of operation in which data is encoded in a sequence of three-bit symbols; and
transmit a second three-phase signal that is representative of the sequence of three-bit symbols on each of the three wires, wherein the second three-phase signal is in a different phase on each wire when each symbol in the sequence of three-bit symbols is transmitted, and wherein a transition in signaling state in at least one wire occurs between transmission of each pair of symbols in the sequence of three-bit symbols.

18. The storage medium of claim 17, wherein signaling states of the three wires are defined by polarity and direction of rotation when the 3-phase encoder is configured for the first mode of operation.

19. The storage medium of claim 18, wherein each symbol in the sequence of two-bit symbols selects between four transitions that are available from each signaling state of the three wires when the 3-phase encoder is configured for the first mode of operation.

20. The storage medium of claim 18, wherein each symbol in the sequence of two-bit symbols comprises a first bit that determines whether a next signaling state has a different polarity than a current signaling state, and a second bit defines phase rotation associated with the next signaling state.

21. The storage medium of claim 18, wherein each symbol in the sequence of three-bit symbols selects between five transitions that are available from each signaling state when the 3-phase encoder is configured for the second mode of operation.

22. The storage medium of claim 21, wherein each symbol in the sequence of three-bit symbols comprises a first bit that determines whether a next signaling state has a different polarity than a current signaling state, a second bit defines phase rotation associated with the next signaling state, and a third bit that determines whether the next signaling state involves only a polarity switch from the current signaling state.

23. The storage medium of claim 17, further comprising:
determine presence of a misalignment of the three wires involving two or more wires;
invert a phase rotation bit of each symbol in the sequence of two-bit symbols when the misalignment of the three wires is determined to affect phase relationships between signals carried on the three wires when the 3-phase encoder is configured for the first mode of operation; and
invert a phase rotation bit of each symbol in the sequence of three-bit symbols when the misalignment of the three wires is determined to affect phase relationships between signals carried on the three wires when the 3-phase encoder is configured for the second mode of operation.

24. The storage medium of claim 23, wherein the presence of the misalignment of the three wires is determined during a training transmission.

25. An apparatus comprising:
means for configuring a 3-phase encoder, wherein in a first mode of operation, data is encoded in a sequence of two-bit symbols, and wherein in a second mode of operation, data is encoded in a sequence of three-bit symbols; and
means for transmitting three-phase signals on each of three wires,
wherein in the first mode of operation, a first three-phase signal that is representative of the sequence of two-bit symbols is transmitted on each of the three wires, wherein the first three-phase signal is in a different phase on each wire when each symbol in the sequence of two-bit symbols is transmitted, and wherein a transition in signaling state in one or more wires occurs between transmission of each pair of symbols in the sequence of two-bit symbols, and
wherein in the second mode of operation, a second three-phase signal that is representative of the sequence of three-bit symbols is transmitted on each of the three wires, wherein the second three-phase signal is in a different phase on each wire when each symbol in the sequence of three-bit symbols is transmitted, and wherein a transition in signaling state in one or more wires occurs between transmission of each pair of symbols in the sequence of three-bit symbols.

26. The apparatus of claim 25, wherein signaling states of the three wires are defined by polarity and direction of rotation when the 3-phase encoder is configured for the first mode of operation.

27. The apparatus of claim 26, wherein each symbol in the sequence of two-bit symbols selects between four transitions that are available from each signaling state when the 3-phase encoder is configured for the first mode of operation.

28. The apparatus of claim 26, wherein each symbol in the sequence of two-bit symbols comprises a first bit that determines whether a next signaling state has a different polarity than a current signaling state, and a second bit defines phase rotation associated with the next signaling state.

29. The apparatus of claim 26, wherein each symbol in the sequence of three-bit symbols selects between five transitions that are available from each signaling state when the 3-phase encoder is configured for the second mode of operation.

30. The apparatus of claim 29, wherein each symbol in the sequence of three-bit symbols comprises a first bit that determines whether a next signaling state has a different polarity than a current signaling state, a second bit defines phase rotation associated with the next signaling state, and a third bit that determines whether the next signaling state involves only a polarity switch from the current signaling state.

* * * * *